US00RE40380E

(19) United States
(12) Reissued Patent
Forte et al.

(10) Patent Number: US RE40,380 E
(45) Date of Reissued Patent: Jun. 17, 2008

(54) PACKING MACHINE AND METHOD

(75) Inventors: Don A. Forte, Springboro, OH (US); Roy V. Pogue, Littleton, CO (US); Frank A. McCampbell, Willows, CA (US); David L. Summa, Smithville, MO (US)

(73) Assignee: Johns Manville International Inc., Denver, CO (US)

(21) Appl. No.: 11/486,362

(22) Filed: Jul. 14, 2006

Related U.S. Patent Documents

Reissue of:
(64) Patent No.: 6,931,823
Issued: Aug. 23, 2005
Appl. No.: 10/649,534
Filed: Aug. 27, 2003

(51) Int. Cl.
*B65B 63/02* (2006.01)

(52) U.S. Cl. ..... 53/528

(58) Field of Classification Search ..... 53/528, 53/541, 339, 447, 438
See application file for complete search history.

(56) References Cited

U.S. PATENT DOCUMENTS

| | | | | | |
|---|---|---|---|---|---|
| 3,720,040 | A | * | 3/1973 | Rocker | 53/500 |
| 3,837,138 | A | * | 9/1974 | Terry | |
| 3,964,232 | A | * | 6/1976 | Bender et al. | |
| 4,074,508 | A | * | 2/1978 | Reid | 53/501 |
| 4,501,107 | A | * | 2/1985 | Piotrowski | 53/438 |
| 4,805,383 | A | * | 2/1989 | Allwein | |
| 5,331,788 | A | * | 7/1994 | Cinotti | 53/228 |
| 5,353,576 | A | * | 10/1994 | Palamides et al. | 53/540 |
| 5,979,145 | A | * | 11/1999 | Louis et al. | 53/439 |

* cited by examiner

*Primary Examiner*—Sameh H. Tawfik
(74) *Attorney, Agent, or Firm*—Crowell & Moring

(57) ABSTRACT

In an insulation blanket-packaging machine and method for continuously packaging insulation blanket in the form of batts there is a continuous: infeed of batts into a loading station; movement of batts from the loading station into a transfer station that also functions as a batt-stacking station; formation of a batt stack in the transfer station; compression of a batt stack in a compression station; envelopment of a compressed batt stack within sheet material in a packaging station to form a package; and removal of a package from the machine. The machine can also be used to package insulation blanket in roll form.

21 Claims, 14 Drawing Sheets

120
130
32
30
116
122
144
124
128
118
94
96
112
98
68
28
92
62
114
20
66
68

PACKING MACHINE AND METHOD

Matter enclosed in heavy brackets [ ] appears in the original patent but forms no part of this reissue specification; matter printed in italics indicates the additions made by reissue.

BACKGROUND OF THE INVENTION

The subject invention relates to an insulation blanket-packaging machine and method and, in particular, to an improved, versatile, high-speed insulation blanket-packaging machine and method especially well suited for economically, efficiently, and rapidly packaging insulation blanket in unfolded batt form, single-fold batt form, spiral wound batt roll form, or continuous length spiral wound form.

Faced and unfaced fiberglass insulation blankets are currently produced and packaged in unfolded batt form, single-fold batt form and spiral wound batt or continuous length roll form on high capacity production lines. Typically, these high capacity production lines each include a high capacity fiberglass insulation blanket manufacturing operation that produces the fiberglass insulation blankets, ready for packaging, as batts in unfolded, single-fold or spiral wound form or as continuous lengths in spiral wound form and a packaging operation for packaging the insulation blankets. The packaging operation normally uses one type of packaging machine for packaging the insulation blankets in their unfolded or single-fold batt form and another type of packaging machine for packaging the insulation blankets in their spiral wound form. To maintain or increase the overall throughput of these high capacity fiberglass insulation blanket production lines, the packaging operations of these production lines must be able to effectively accommodate and package the large amounts of insulation blanket produced, in unfolded batt form, single-fold batt form, and/or roll form, in the fiberglass insulation blanket manufacturing operations. If the packaging operations are unable to accommodate and effectively package the fiberglass insulation blanket in the forms produced for packaging in the manufacturing operations, the packaging operations become bottlenecks that limit the overall production capacity of the fiberglass insulation blanket production lines. Thus, there is a need for packaging operations in these fiberglass insulation blanket production lines that have capacities that at least equal and, preferably, exceed the production capacities of the fiberglass insulation blanket manufacturing operations.

In batt form, fiberglass insulation blankets are currently sold in packages that contain between two and twelve compressed batts per package. For sales to builders and commercial insulation contractors, the fiberglass insulation blankets are commonly sold in a package containing between four and thirty compressed batts. The shorter length batts (e.g. batts about four feet in length) are typically packaged in an unfolded condition. The longer batts (e.g. batts about eight feet in length) are typically folded in half so that the length of the package containing the batts approximates one-half of the length of the batts within the package (e.g. about four feet). For retail sales to do-it-yourselfers and the like, the fiberglass insulation blankets are commonly sold in a package containing several compressed batts that are wound in a spiral form or a compressed continuous length of insulation blanket that is wound in spiral form (e.g. an insulation blanket about thirty feet in length). As stated above, typically, a first type of packaging machine is used in the packaging operation to package the unfolded or single-fold batts of insulation blanket while a second type of packaging machine is used in the packaging operation to package spiral wound rolls of insulation blanket. The use of two different packaging machines in the packaging operation: may require the use of package forming sheet materials that differ from each other in size or other respects, reduces the efficiency of the packaging operation, increases the number of operators required for and the costs of the packaging operation, and increases the floor space required for the packaging operation. The amount of floor space required for a packaging operation to accommodate the production capacity of a fiberglass insulation blanket manufacturing operation can become quite a problem, especially when the capacity of a fiberglass insulation blanket manufacturing operation is increased and there is only limited floor space available for the packaging operation in an existing production facility.

In addition to the above, the fiberglass insulation blanket in the packages containing the fiberglass insulation blanket in spiral wound roll form can not be compressed to the degree that the fiberglass insulation blanket can be compressed in the packages containing the fiberglass insulation blanket in unfolded batt or single-fold batt form without damaging the insulation blanket and reducing the ability of the insulation blanket to recover in thickness after the insulation blanket is removed from the packages for installation. Thus, insulation blanket in roll form is typically not compressed to the degree that unfolded or single-fold batts are compressed and for packages containing the same cubic footage of insulation, the packages containing fiberglass insulation in roll form rather than unfolded or single-fold batt form take up additional warehouse space, transportation space, and shelf space at retail outlets to thereby increase the costs and handling problems involved in storing, transporting and selling the product.

Thus, there has remained a need for an insulation blanket-packaging machine for use in these fiberglass insulation blanket production lines and other insulation blanket production lines: that can easily accommodate the production capacities of these production lines and future increases in the production capacities of these production lines; that has the versatility to package selected numbers of fiberglass insulation batts in a flat unfolded or single-fold form (e.g. between two and thirty batts) to achieve the maximum practical compression of the fiberglass insulation batts while maintaining the required thickness recovery characteristics for the batts; that forms packages sized to minimize the storage, transportation and retail space required for the packages; that forms packages that are easy to handle; that makes effective use of available floor space in the production facility; and that reduces the number of operators required for the packaging operation and is otherwise cost effective and efficient. The need has also remained for such an insulation blanket-packaging machine that is versatile so that the machine can also be used to package insulation blanket that is wound in spiral roll form where marketing or other configurations dictate the use of such packages even though such packages typically occupy more space for equal amounts in cubic footage of insulation.

SUMMARY OF THE INVENTION

The insulation blanket-packaging machine of the subject invention: can efficiently accommodate and package the batt output from high capacity fibrous insulation blanket production lines; can package any selected number of batts per package over a wide range, e.g. between 2 and 30 batts per package; can be easily adjusted to change the number of batts contained per package; and can package batts in a flat unfolded or a flat single-fold form to permit the maximum practical compression of the batts without any significant adverse affect on the thickness recovery characteristics of the batts. The blanket-packaging machine of the subject is particularly well suited for forming, compressing and packaging stacks of faced and unfaced fiberglass insulation batts. The insulation blanket-packaging machine of the subject invention can also be used to package spiral wound rolls of fibrous insulation blanket in packages containing one, two or three spiral wound rolls per package.

The insulation blanket-packaging machine of the subject invention includes: an infeed station; a loading station for receiving insulation blankets in the form of unfolded batts, single-fold batts, or spiral wound rolls; a transfer station for transferring insulation blankets in the form of unfolded batts, single-fold batts, or spiral wound rolls from the loading station to a compression station and for forming batt stacks; a compression station for compressing insulation blankets in the form of unfolded batts, single-fold batts, or spiral wound rolls; a packaging station for packaging stacks of compressed insulation blankets in the form of unfolded batts or single-fold batts or groupings of compressed spiral wound rolls of insulation blanket; and a takeoff conveyor for removing packages from the packaging station.

When packaging fibrous insulation blankets in the form of unfolded batts and single-fold batts, the fibrous insulation batts are preferably metered one at a time directly into the loading station of the insulation blanket-packaging machine from the downstream end of a fibrous insulation blanket production line. The loading station has a launch frame assembly for successively moving the batts in a generally vertical direction from the batt loading station into the transfer station/batt-stacking chamber. When packaging unfolded batts and single-fold batts, the transfer station also functions as a batt-stacking chamber for successively forming batt stacks of vertically stacked batts from the batts fed into the transfer station from the loading station. The number of batts contained in each batt stack can be selected by the operator to suit various packaging requirements. The loading and transfer stations also include a staging fork assembly for vertically moving a single batt from the loading station to the transfer station to complete the formation of each batt stack formed in the transfer station and for vertically moving the batt stack thus formed from the transfer station into the compression station of the insulation blanket-packaging machine. The compression station of the insulation blanket-packaging machine includes upper and lower compression conveyors for successively receiving there between the batt stacks fed from the transfer station. The upper and lower compression conveyors are movable relative to each other for successively compressing the batt stacks received intermediate the upper and lower compression conveyors to a selected thickness in a direction (except for the fold in the single-fold insulation batts) perpendicular to the thicknesses of the batts. After each batt stack has been compressed, the compression conveyors successively move the compressed batt stacks from the compression station into the packaging station. The packaging station successively envelopes the compressed batt stacks fed from the compression station within sheet material to successively form packages of the compressed batt stacks fed from the compression station.

Preferably, the control system of the insulation blanket-packaging machine operates the insulation blanket-packaging machine as a continuous operation. In the continuous packaging operation: insulation batts are successively metered one insulation batt at a time from the downstream end of a production line into the loading station: stacks of insulation batts are successively formed one stack at a time in the transfer station and successively moved into the compression station; stacks of insulation batts are successively compressed one stack at a time in the compression station; stacks of compressed insulation batts are packaged one stack at a time in the packaging station; and packages of compressed insulation batts are successively removed from the packaging station one package at a time by a takeoff conveyor.

When packaging fibrous insulation blankets in spiral wound roll form (either a series of batts or a continuous length of insulation blanket in spiral wound roll form), groupings of one, two or three spiral wound rolls of fibrous insulation blankets are preferably metered one grouping at a time directly into the loading station of the insulation blanket-packaging machine from the downstream end of a fibrous insulation blanket production line. Where groupings of two or three spiral wound rolls of insulation blanket are metered together directly into the loading station, the spiral wound rolls in each grouping are fed into the loading station in a side-by-side relationship. When packaging spiral wound rolls of insulation blanket, the launch frame assembly in the loading station is deactivated and the staging fork assembly is used to vertically move the grouping of one or two spiral wound rolls of insulation blanket directly from the loading station through the transfer station and into the compression station of the insulation blanket-packaging machine. In the compression station, each grouping of one, two or three spiral wound rolls of insulation blanket moved into the compression station from the loading station is successively received between the upper and lower compression conveyors of the compression station. The upper and lower compression conveyors then move relative to each other to successively compress each grouping of one, two or three spiral wound rolls received intermediate the upper and lower compression conveyors to a selected thickness in a direction perpendicular to central axes of the rolls and reform the rolls from a generally round shape to a flat oval shape. After each grouping of one, two or three rolls has been compressed, the compression conveyors successively move the compressed grouping of one or two rolls from the compression station into the packaging station. The packaging station successively envelopes the compressed groupings of one, two or three rolls of insulation blanket within sheet material to successively form packages of the compressed groupings of one or two rolls of insulation blanket fed from the compression station.

Preferably, the control system of the insulation blanket-packaging machine operates the insulation blanket-packaging machine as a continuous operation. In the continuous packaging operation: groupings of one or two spiral wound rolls of insulation blanket are successively metered one grouping at a time from the downstream end of a production line into the loading station; groupings of one or two spiral wound rolls of insulation blanket are successively moved one grouping at a time from the loading station through the transfer station into the compression station; groupings of one, two or three spiral wound rolls of insulation blanket are successively compressed one grouping at a time in the compression station; groupings of one or two compressed spiral wound rolls of insulation blanket are packaged one grouping at a time in the packaging station; and packages of compressed insulation rolls are removed from the packaging station one package at a time by the takeoff conveyor.

BRIEF DESCRIPTION OF THE DRAWINGS

FIG. 17 is a schematic view of the right side of insulation blanket-packaging machine.

DESCRIPTION OF THE PREFERRED EMBODIMENTS

Figure 1:
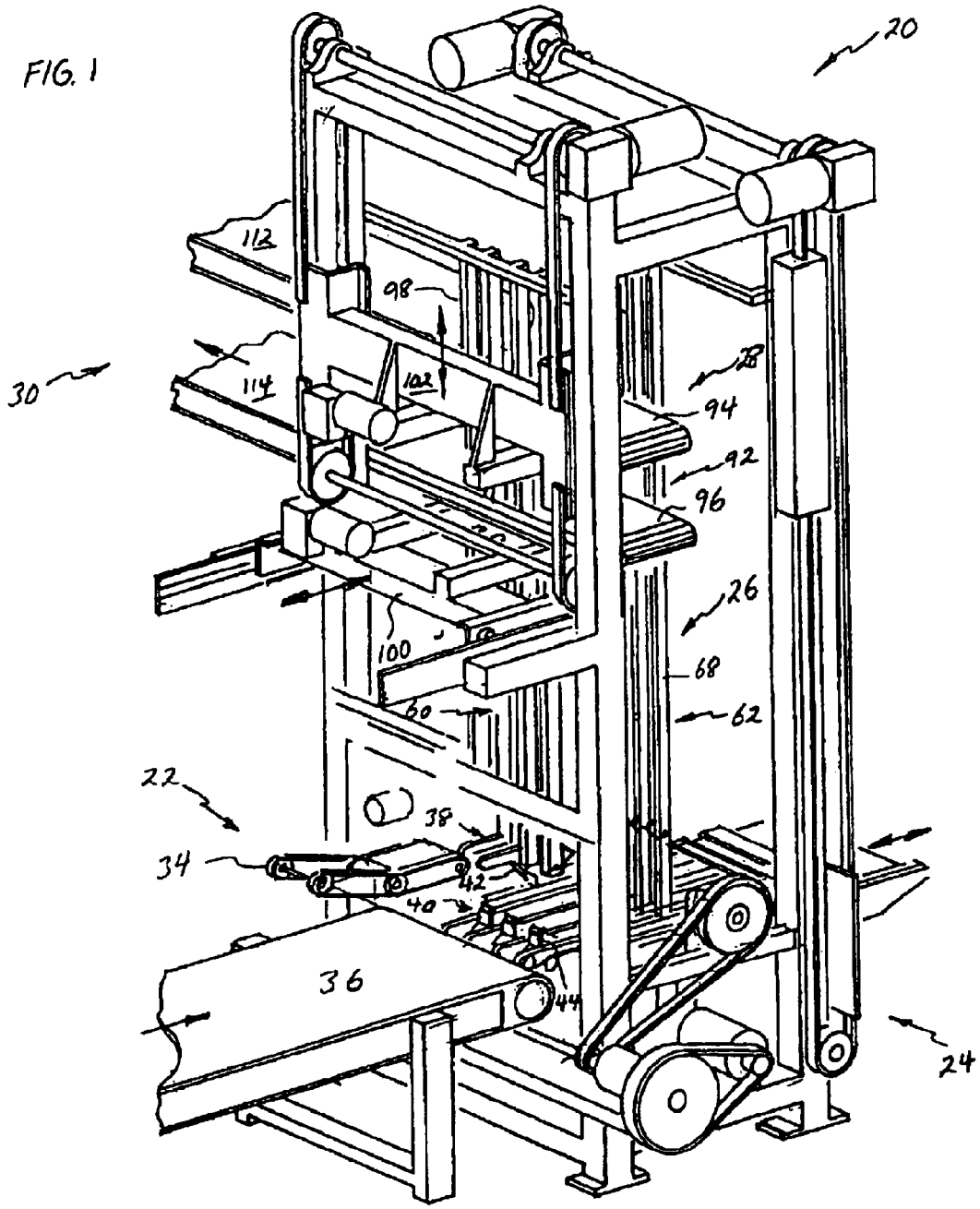
FIG. 1 is a schematic perspective view of the infeed station, the loading station, the transfer station and the compression station of the insulation blanket-packaging machine of the subject invention.
Figure 2A:
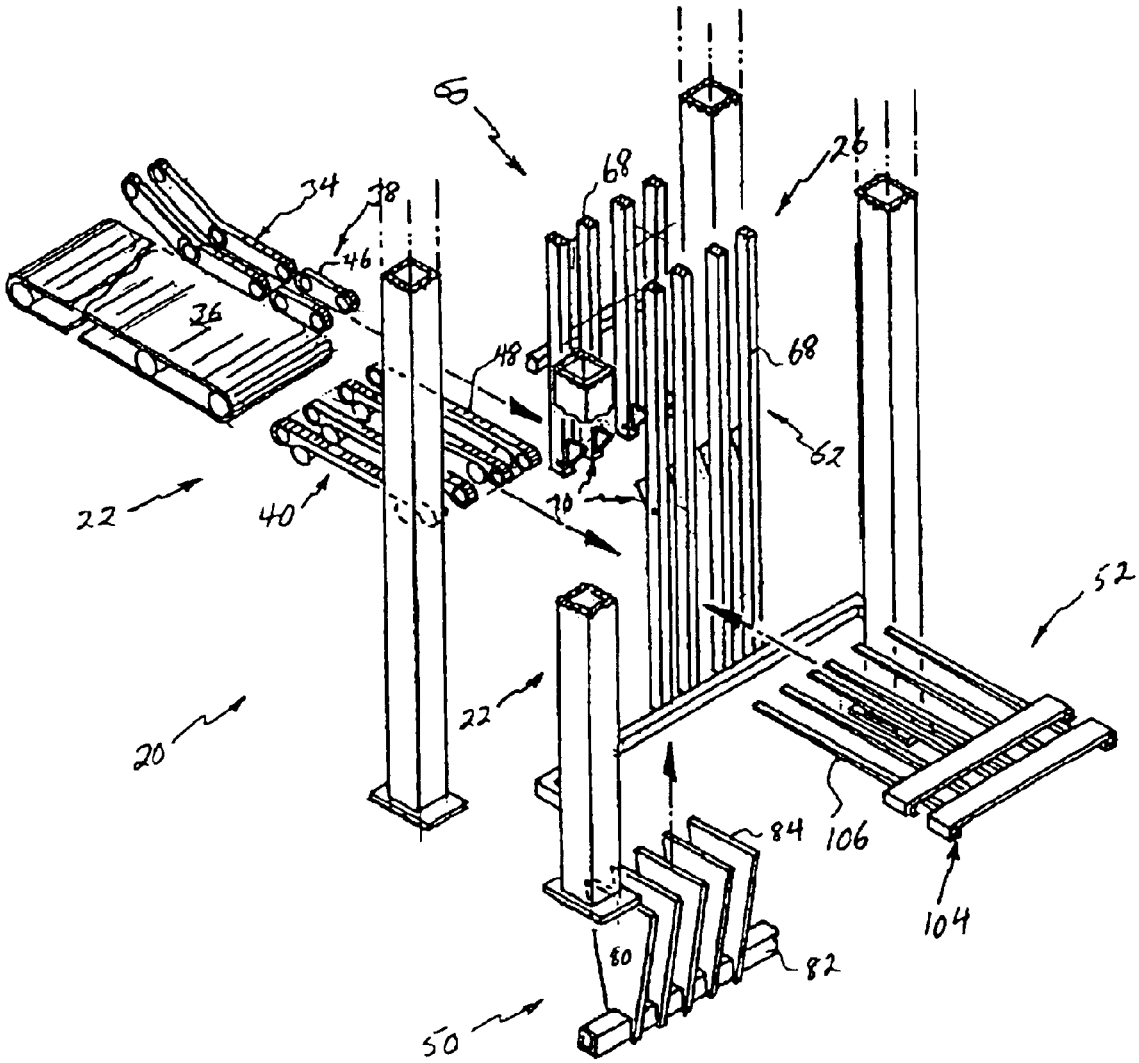
FIGS. 2A and 2B are an exploded schematic perspective view of the infeed station, the loading station, the transfer station, the compression station, the packaging station, and the takeoff conveyor of the insulation blanket-packaging machine of the subject invention.
Figure 2B:
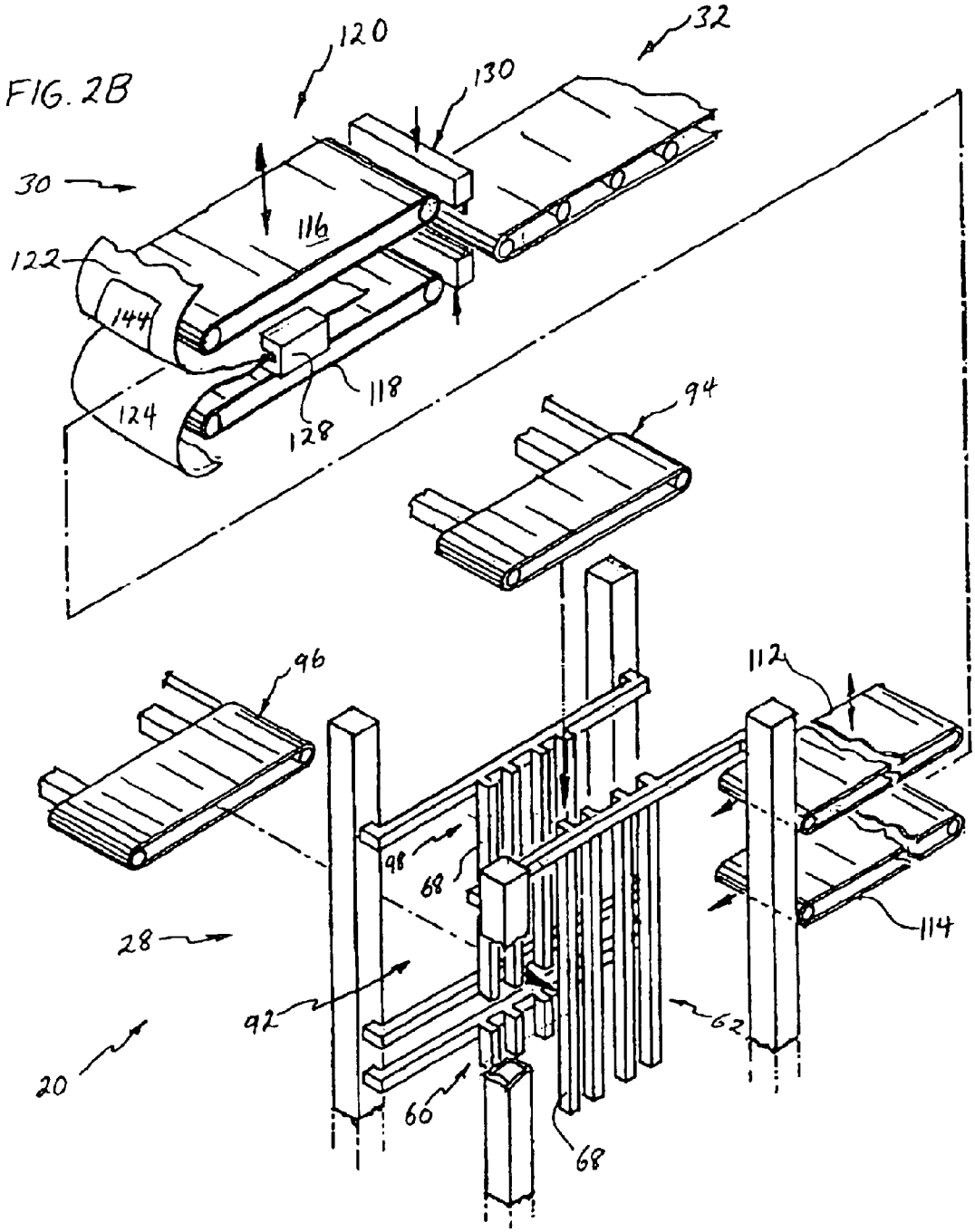

As shown in FIGS. 1 and 2A and 2B the insulation blanket-packaging machine 20 of the subject invention includes: an infeed station 22; a loading station 24; a transfer station 26; a compression station 28; a packaging station 30; and a package takeoff conveyor 32. The insulation blanket-packaging machine 20 can be grouping up to handle insulation blankets in the form of unfolded or single-fold batts or to handle spiral wound rolls of insulation blanket.

Figure 3:
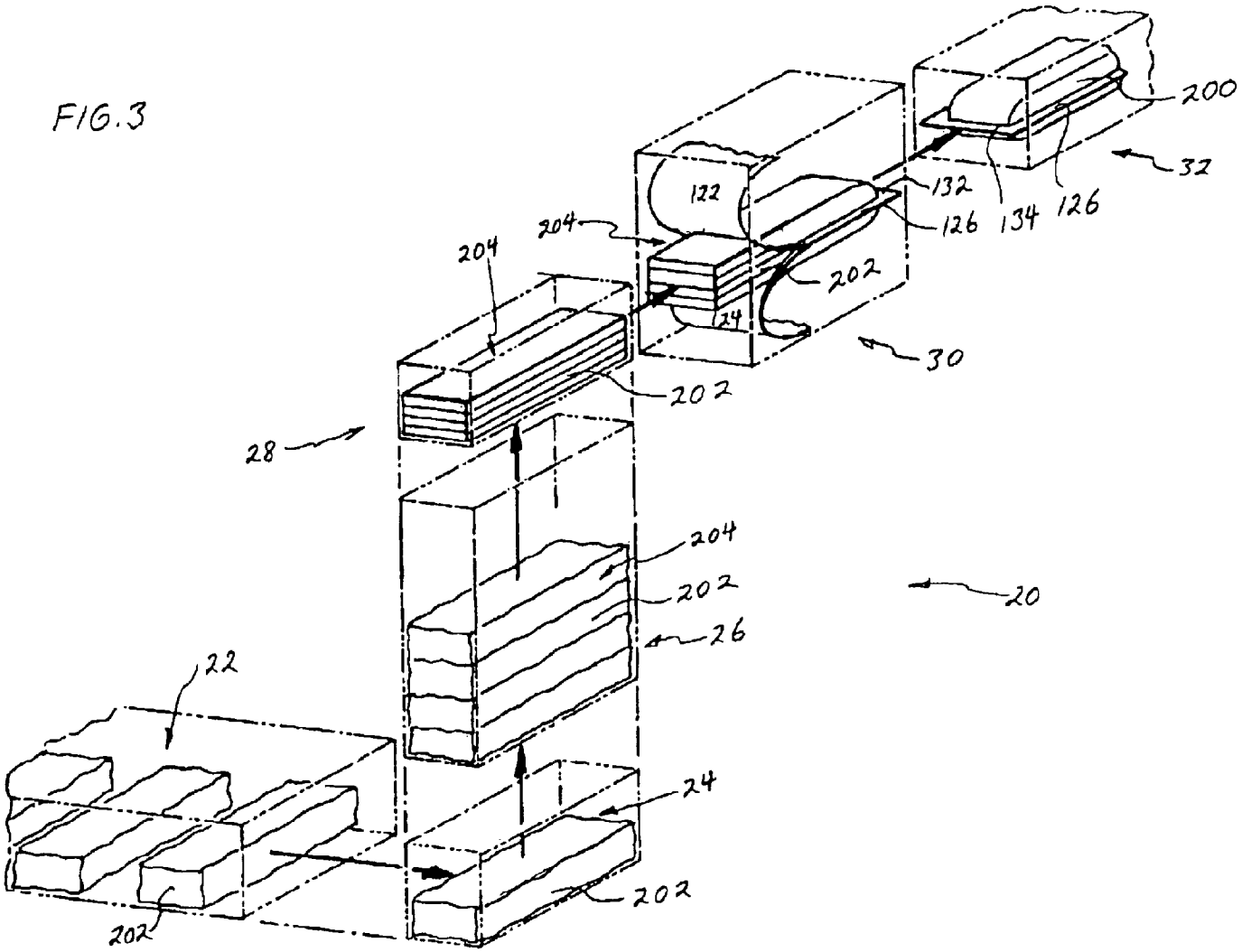
FIG. 3 is a flow diagram showing the formation of packages that contain a compressed stack of four insulation batts with the insulation blanket-packaging machine of the subject invention.

FIG. 3 is a flow diagram showing the insulation blanket-packaging machine 20 being used to form packages 200 of unfolded or single-fold insulation batts 202. In this example, for purposes of illustration, each package 200 formed contains a stack of four compressed unfolded or single-fold insulation batts 202. When utilizing the insulation blanket-packaging machine to package unfolded or single-fold insulation batts 202, the insulation batts 202 are successively conveyed one at a time from the infeed station 22 into the loading station 24. The insulation batts 202 are then successively fed one batt at a time from the loading station 24 into the transfer station 26, which also functions as a batt-stacking chamber, to form a stack 204 of insulation batts. Once a stack 204 of the selected number of insulation batts has been formed in the transfer station 26, the stack 204 of insulation batts is moved into the compression station 28 where the stack of insulation batts is compressed to a desired degree for packaging. The stack 204 of compressed insulation batts is then moved from the compression station 28 into the packaging station 30 where the stack of compressed insulation batts is enclosed within sheet material to form a package 200 of compressed insulation batts. The package 200 of compressed insulation batts is then removed from the packaging station 30 by the takeoff conveyor 32 for storage or shipment.

Figure 4:
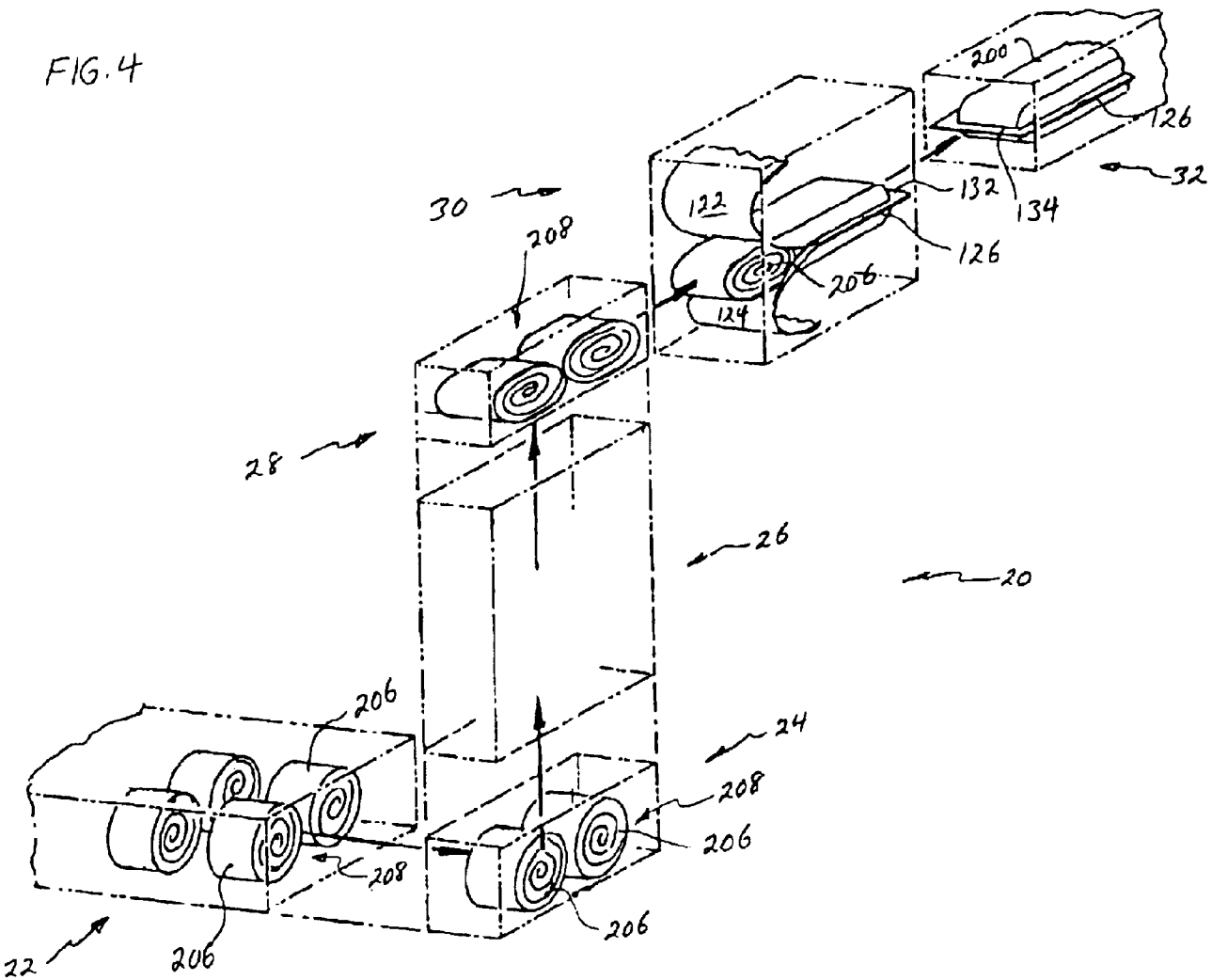
FIG. 4 is a flow diagram showing the formation of packages that contain a grouping of two compressed insulation rolls with the insulation blanket-packaging machine of the subject invention.
Figure 5:
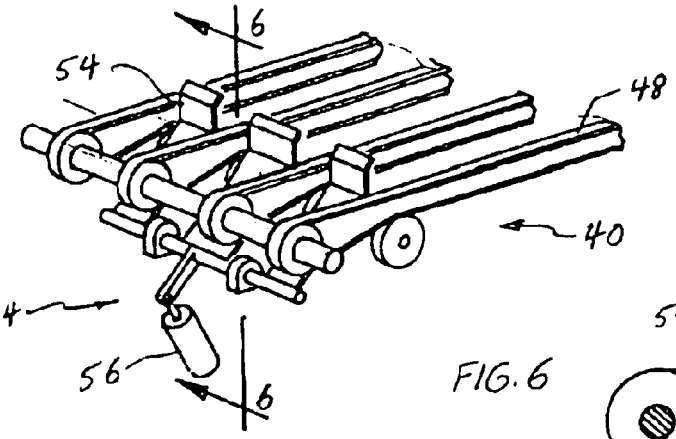
FIG. 5 is a perspective view of the stop mechanisms used in the lower metering conveyor of the infeed station of the insulation blanket-packaging machine of the subject invention.

FIG. 4 is a flow diagram showing the insulation blanket-packaging machine 20 being used to form packages 200 of insulation rolls 206. In this example, for purposes of illustration, each package 200 formed contains a grouping 208 of two compressed insulation rolls 206. When utilizing the insulation blanket-packaging machine to package groupings of two insulation rolls, groupings 208 of two insulation rolls 206 are successively conveyed one grouping at a time from the infeed station 22 into the loading station 24. The insulation rolls 206 in each grouping 208 of insulation rolls are fed into the loading station 24 in a side-by-side relationship and remain in that side-by-side relationship during the packaging operation. The groupings 208 of insulation rolls are successively fed one grouping at a time from the loading station 24 through the transfer station 26 into the compression station 28. In the compression station 28, the groupings 208 of insulation rolls are successively compressed to a desired degree for packaging. The groupings 208 of compressed insulation rolls 206 are then successively moved from the compression station 28 into the packaging station 30 where each grouping of two compressed insulation rolls is successively enclosed within sheet material to form a package 200 of two compressed insulation rolls. The package 200 of compressed insulation rolls is then removed from the packaging station by the takeoff conveyor 32 for storage or shipment.

The infeed station 22 of the insulation blanket-packaging machine 20 has upper and lower conveyors 34 and 36 for successively feeding insulation blanket in the form of batts or rolls between upper and lower metering conveyor assemblies 38 and 40. The metering conveyor assemblies 38 and 40 each include a stop mechanism 42 and 44 that, at selected intervals, are actuated and cooperate with each other to prevent the movement of an insulation batt or roll into the loading station 24. By preventing the movement of an insulation batt or roll into the loading station at selected intervals, the stop mechanisms 42 and 44 prevent an insulation batt or roll, being fed into the loading station by the metering conveyor assemblies, from interfering with the movement from the loading station 24 into the transfer station 26 of an insulation batt or roll already in the loading station.

The upper and lower metering conveyor assemblies 38 and 40 each include a plurality of narrow, parallel extending, spaced-apart conveyor belts. The plurality of narrow spaced-apart conveyor belts 46 of the upper metering conveyor assembly 38 only extend part of the way into loading station 24 so that the upper metering conveyor assembly 38 does not obstruct the passageway from the loading station 24 into the transfer station 26 through which the insulation batts or rolls are moved from the loading station into the transfer station.

The plurality of narrow spaced-apart conveyor belts 48 of the lower metering conveyor assembly 40 extend through the loading station 24 and support the insulation batts or rolls while the insulation batts or rolls are in the loading station 24 prior to be moved from the loading station into the transfer station 26. The spacings between the spaced-apart conveyor belts 48 of the lower metering conveyor assembly 40 is such that the spaced-apart conveyor belts 48 of the lower metering conveyor assembly 40 will not obstruct the operation of a launch frame assembly 50 or a staging fork assembly 52 of the insulation blanket-packaging machine.

Figure 6:
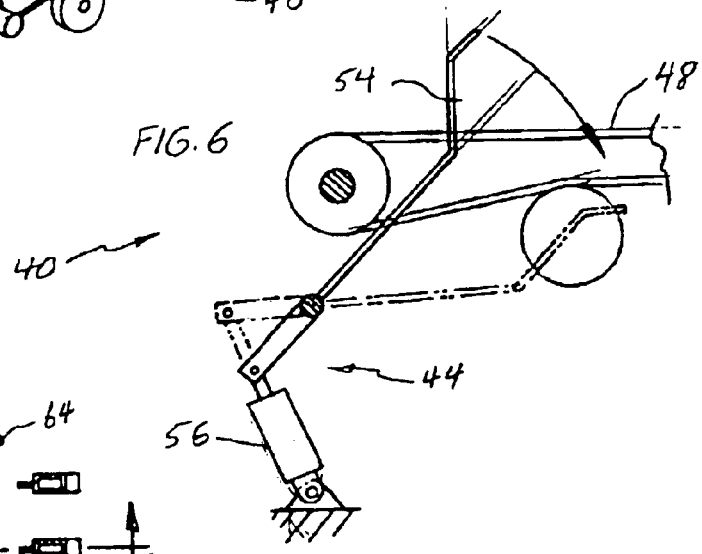
FIG. 6 is a side view, taken substantially along lines 6—6 of FIG. 5, of one of the stop arms and the actuating cylinder of one of the stop mechanisms used in connection with the metering conveyors of the infeed station of the insulation blanket-packaging machine of the subject invention.

The stop mechanism 44 of the lower metering conveyor assembly 40 includes one or more stop arms 54 that are mounted to pivot from a first retracted position (shown in phantom line in FIG. 6) where the stop arms do not obstruct the movement of insulation batts or rolls by the lower metering conveyor assembly 40 into the loading station to a second extended position (shown in solid line in FIG. 6) where the stop arms 56 obstruct the movement of insulation batts or rolls by the lower metering conveyor assembly into the loading station. The stop mechanism 42 of the upper metering conveyor assembly 38 functions the same as the stop mechanism 44 of the lower metering conveyor 40. The stop mechanism 42 includes a one or more stop arms that, like the stop arms 54 of the stop mechanism 44, are mounted to pivot from a first retracted position where the stop arms do not obstruct the movement of insulation batts or rolls by the upper metering conveyor assembly 38 into the loading station to a second extended position where the stop arms obstruct the movement of insulation batts or rolls by the upper metering conveyor assembly into the loading station. The conveyors 34 and 36 and the metering conveyor assemblies 38 and 40 are powered by conventional motor drive trains that are intermittently activated to convey the insulation batts or rolls from an insulation blanket production line into the loading station 24. The stop arms of the stop mechanism 42 and 44 are pivoted between their retracted and extended positions by conventional pneumatic or hydraulic cylinders 56 that are intermittently actuated to obstruct or permit the movement of insulation batts or rolls into the loading station 24.

Figure 7:
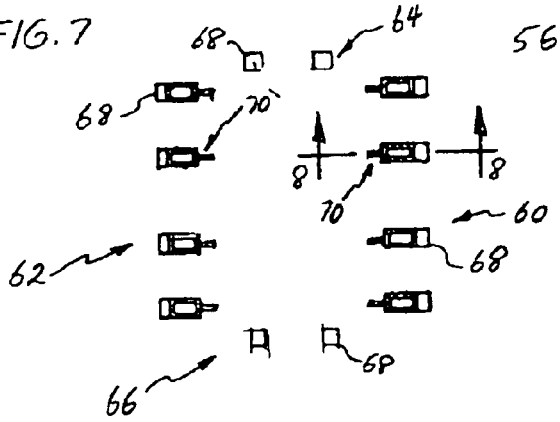
FIG. 7 is a horizontal section through the lower portion of the transfer station showing the shelf dogs for retaining insulation batts in the transfer station of the insulation blanket-packaging machine of the subject invention.
Figure 8:
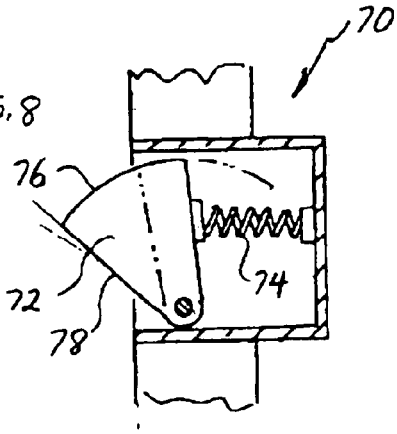
FIG. 8 is a side view, partially in section, of a shelf dog taken substantially along lines 8—8 of FIG. 7.

As shown in FIGS. 1 and 2A and 2B, the transfer station 26 includes sidewalls 60 and 62. In addition to the sidewalls 60 and 62, preferably, the transfer station also includes end walls 64 and 66 (not shown in FIGS. 1 and 2A and 2B, but shown in cross section in FIG. 7). The sidewalls or the sidewalls and end walls of the transfer station 26 not only function to contain and guide insulation batts or rolls as the insulation batts or rolls are moved between the loading station 24 and the compression station 28, but when the insulation blanket-packaging machine 20 is being used to package batts, the sidewalls or the sidewalls and the end walls also function as a stacking chamber for stacking batts.

Preferably, the sidewalls and end walls of the transfer station 26 are each formed by a plurality of parallel, vertically extending, spaced-apart frame members 68. Preferably, the frame members 68 forming the sidewall 60 of the transfer station 26 extend from immediately above the downstream end of the metering conveyor assembly 38 upward through the transfer station to the compression station 28. Preferably, the frame members 68 of the sidewall 62 extend from immediately above the downstream end of the metering conveyor assembly 40 upward through the transfer station 26 and the compression station 28 to form a common sidewall for the loading station 24, transfer station 26 and compression station 28. The frame members 68 of the sidewall 62 are spaced from each other so that the frame members do not obstruct the operation of either the launch frame assembly 50 or the staging fork assembly 52 and, preferably, are vertically aligned with the belts 48 of the lower metering conveyor assembly 40. Preferably, the end wall 64 extends from a level immediately above the lower metering conveyor assembly 40 upward through the transfer station 26 to the compression station 28 to form a common end wall for the loading station and transfer station. The end wall 66 also extends from a level immediately above the lower metering conveyor assembly 40 upward through the transfer station 26 to the compression station 28 to form a common end wall for the loading station and transfer station. Preferably, the end walls 64 and 66 include conventional drive trains for moving the end walls toward and away from each other to regulate the length of the loading station 24 and the transfer station 26.

The sidewalls 60 and 62 are each equipped with shelf dog assemblies 70 that permit insulation batts or rolls to be moved from the loading station 24 up into the transfer station 26, but prevent insulation batts that have been moved up into the transfer station from dropping back down into the loading station. There are a plurality of shelf dog assemblies 70 associated with each sidewall 60 and 62 that, preferably, are mounted on each frame member 68 of each sidewall. The shelf dog assemblies 70 are positioned so that the shelf dog assemblies do not obstruct the operation of either the launch frame assembly 50 or the staging fork assembly 52. The shelf dog assemblies are also positioned to retain insulation batts within the transfer station 26 on a level immediately above the level of the upper metering conveyor assembly 38. In a preferred embodiment, each of the shelf dog assemblies 70 includes a pivotally mounted generally triangular shaped support member 72 that is normally held in an extended position by a coil spring 74. In the exerted position an upper surface 76 of the support member 72 will engage the underside of a batt in the transfer station 26 to retain, in cooperation with the other shelf dog assemblies, the batt within the transfer station. However, as the inclined underside 78 of the support member 72 is engaged by an insulation batt or roll when an insulation batt or roll in moved into the transfer station 26 from the loading station 24, the forces exerted on the underside of the support member 72 by the insulation batt or roll compress the coil spring 74 and the support member 72 is pivoted out of the way to permit the passage of the insulation batt or roll from the loading station 24 into the transfer station 26.

Figure 9:
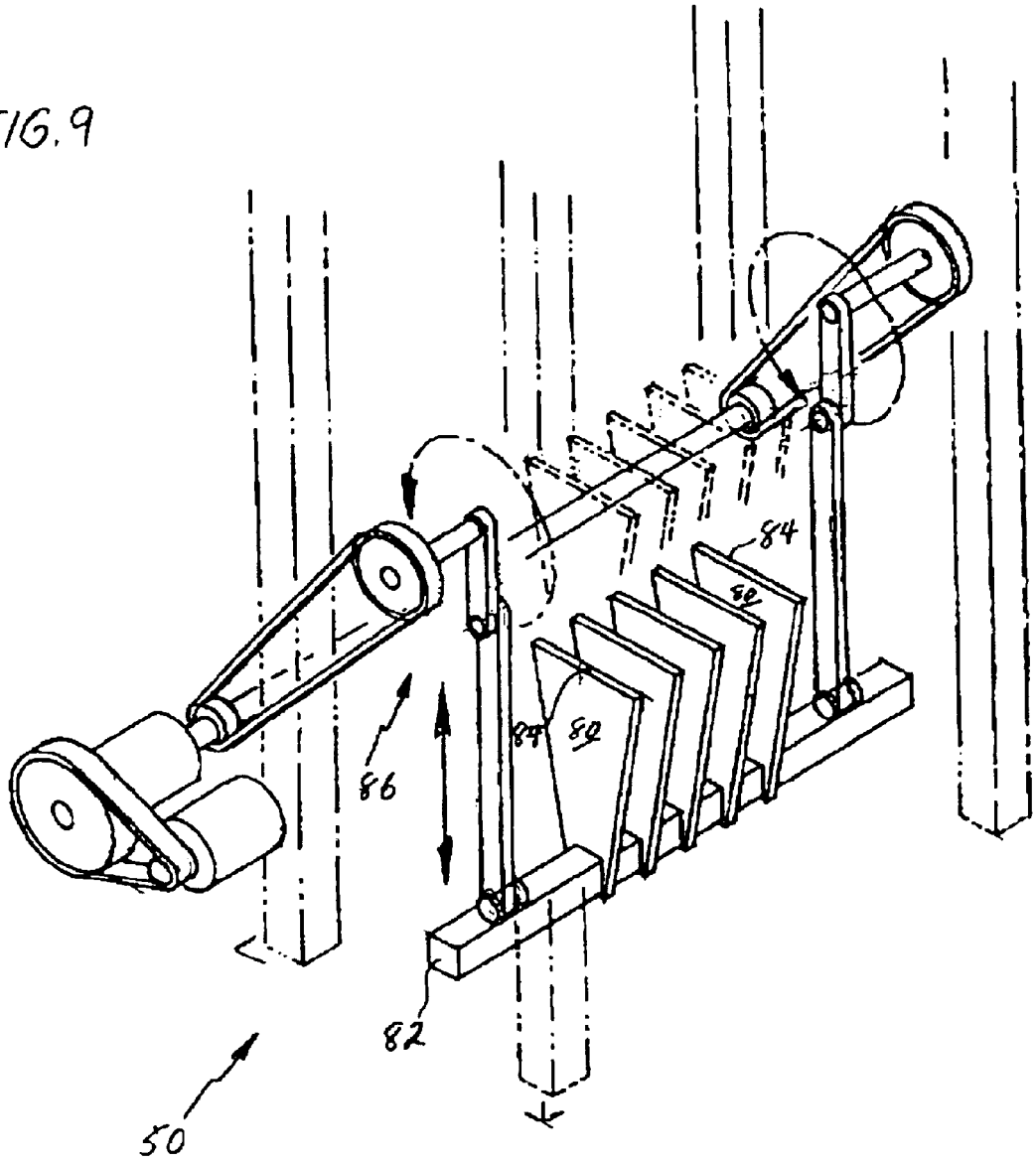
FIG. 9 is a perspective view of the launch frame assembly of the insulation blanket-packaging machine of the subject invention.

The launch frame assembly 50 shown in FIG. 9 is utilized to move insulation batts from the loading station 24 into the transfer station 26 where the shelf dog assemblies 70 support the insulation batts during the formation of batt stacks in the transfer station. In a preferred embodiment, the launch frame assembly 50 includes a plurality of launch frame members 80 that are welded or otherwise affixed to and extend vertically upward from a common drive bar 82. Each launch frame member 80 has a generally triangular shape with a generally horizontally extending upper surface 84. When the launch frame assembly 50 is actuated, the upper surfaces 84 of the launch frame members 80 engage the underside of an insulation batt resting on the conveyor belts 48 of the lower metering conveyor assembly 40 in the loading station 24 and move the insulation batt from the loading station 24 into the transfer station 26. As shown in FIG. 9, preferably, the launch frame assembly 50 is driven by an eccentric drive 86 connected to the drive bar 82. The drive bar 82 is constrained by guide rails, not shown, to move vertically so that the eccentric drive 86 causes the launch frame assembly 50 to reciprocate vertically from a retracted lowermost position to an extended uppermost position.

The launch frame assembly 50 is positioned relative to the conveyor belts of 48 of the lower metering conveyor 40 so that the launch frame members 80 of the launch frame assembly extend between the conveyor belts 48. In the retracted lowermost position of the launch frame members 80, the upper surfaces 84 of launch frame members 80 of the launch frame assembly are at or immediate below the upper surfaces of the conveyor belts 48 of the lower metering conveyor assembly 40 so that the launch frame members do not obstruct the movement of batts into the loading station 24. In the extended uppermost position of the launch frame members 80, the upper surfaces 84 of launch frame members 80 of the launch frame assembly are at a level immediate above the upper surfaces 76 of the shelf dog assemblies 70 so that when the launch frame members 80 of the launch frame assembly are retracted from their uppermost position, the batts are transferred from the upper surfaces of the launch frame members 80 to and supported by the shelf dog assemblies 70 of the transfer station 26.

Figure 10:
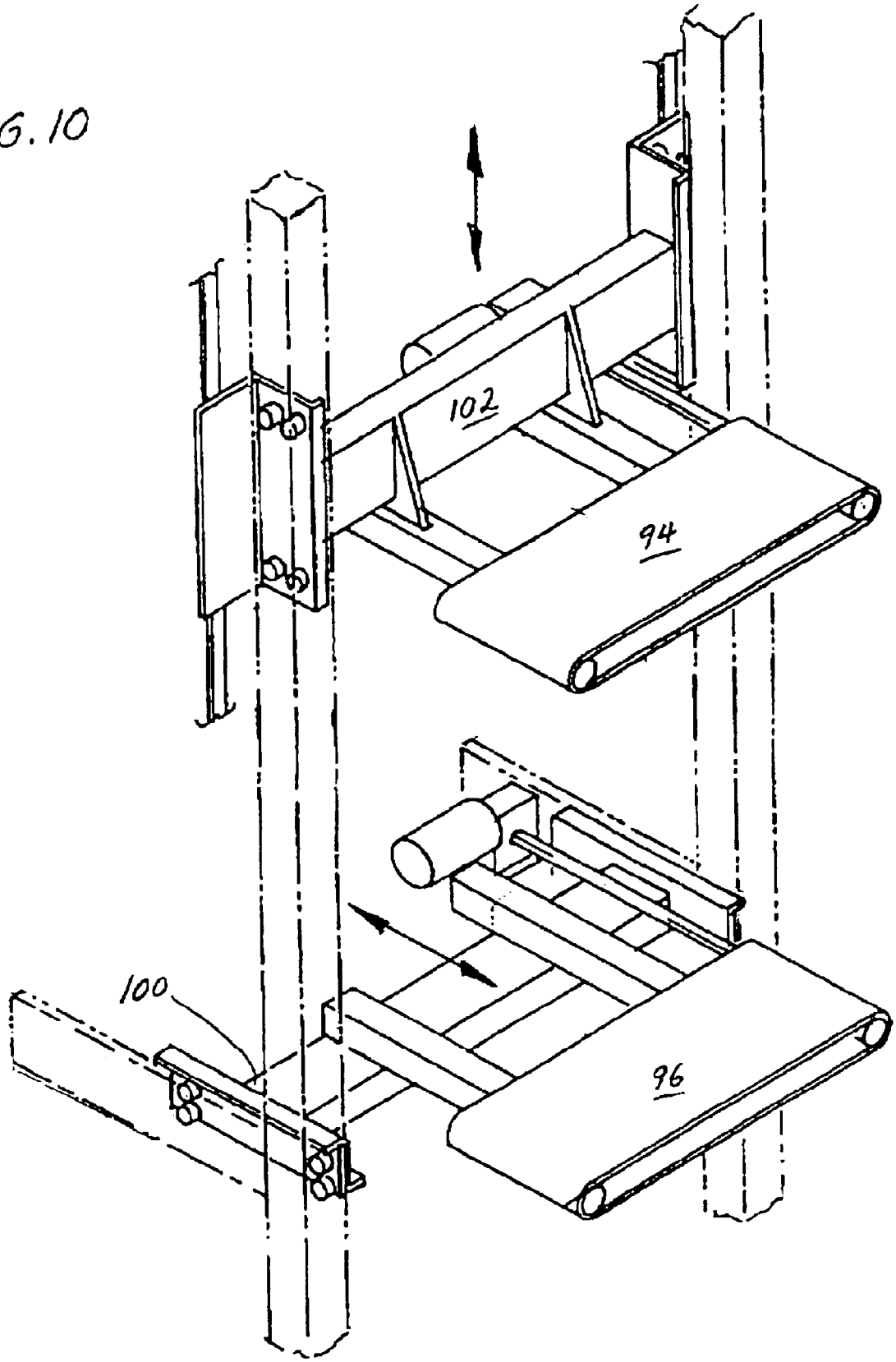
FIG. 10 is a perspective view of the upper and lower compression conveyors of the compression station of the insulation blanket-packaging machine of the subject invention.

As shown in FIGS. 1, 2B and 10, the compression station 28 includes a compression chamber 92 and upper and lower compression conveyors 94 and 96 for successively compressing stacks of insulation batts or groupings of one, two or three insulation rolls and discharging the compressed stacks of insulation batts or insulation rolls into the packaging station 30. The compression chamber 92 has two sidewalls. One of the sidewalls of the compression chamber 92 is formed by the common sidewall 62 of the loading station, the transfer station, and the compression station. The other sidewall 98 of the compression chamber 92 is vertically aligned with the sidewall 60 of the transfer station 26, but is spaced above the upper end of the sidewall 60 a distance sufficient to permit the lower compression conveyor 96 to be moved horizontally from a retracted position outside of the compression chamber to an extended position within the compression chamber. Like the other walls, preferably, spaced-apart vertical frame members 68 form the sidewall 98 of the compression chamber.

The lower compression conveyor 96 is mounted on a carriage 100 so that the lower compression conveyor 96 can be moved horizontally between a retracted position and an extended position. In the retracted position, the lower compression conveyor 96 does not extend into the compression chamber 92 where the lower compression conveyor would obstruct the passage of a stack of insulation batts or a grouping of insulation rolls from the transfer station 26 into the compression station 28. In the extended position, the lower compression conveyor 96 forms the lower wall of the compression chamber 92. The upper compression conveyor 94 forms the upper wall of the compression chamber 92 and is mounted on a carriage 102 so that the upper compression conveyor 94 can be moved between an uppermost retracted position and a selected lower extended position for compressing a stack of insulation batts or a grouping of insulation rolls between the upper compression conveyor 94 and the lower compression conveyor 96. The lower extended position of the upper compression conveyor 94 can be vertically adjusted and is selected to achieve a desired degree of compression for the stack of insulation batts or a grouping of insulation rolls being packaged. Once a stack of insulation batts or a grouping of insulation rolls has been compressed to a desired degree, the upper and lower compression conveyors 94 and 96 are actuated to discharge the compressed stack of insulation batts or the compressed grouping of insulation rolls into the packaging station 30. The carriages supporting the compression conveyors and the compression conveyors are driven and controlled during their operating cycles by conventional drive trains and control systems.

Figure 11:
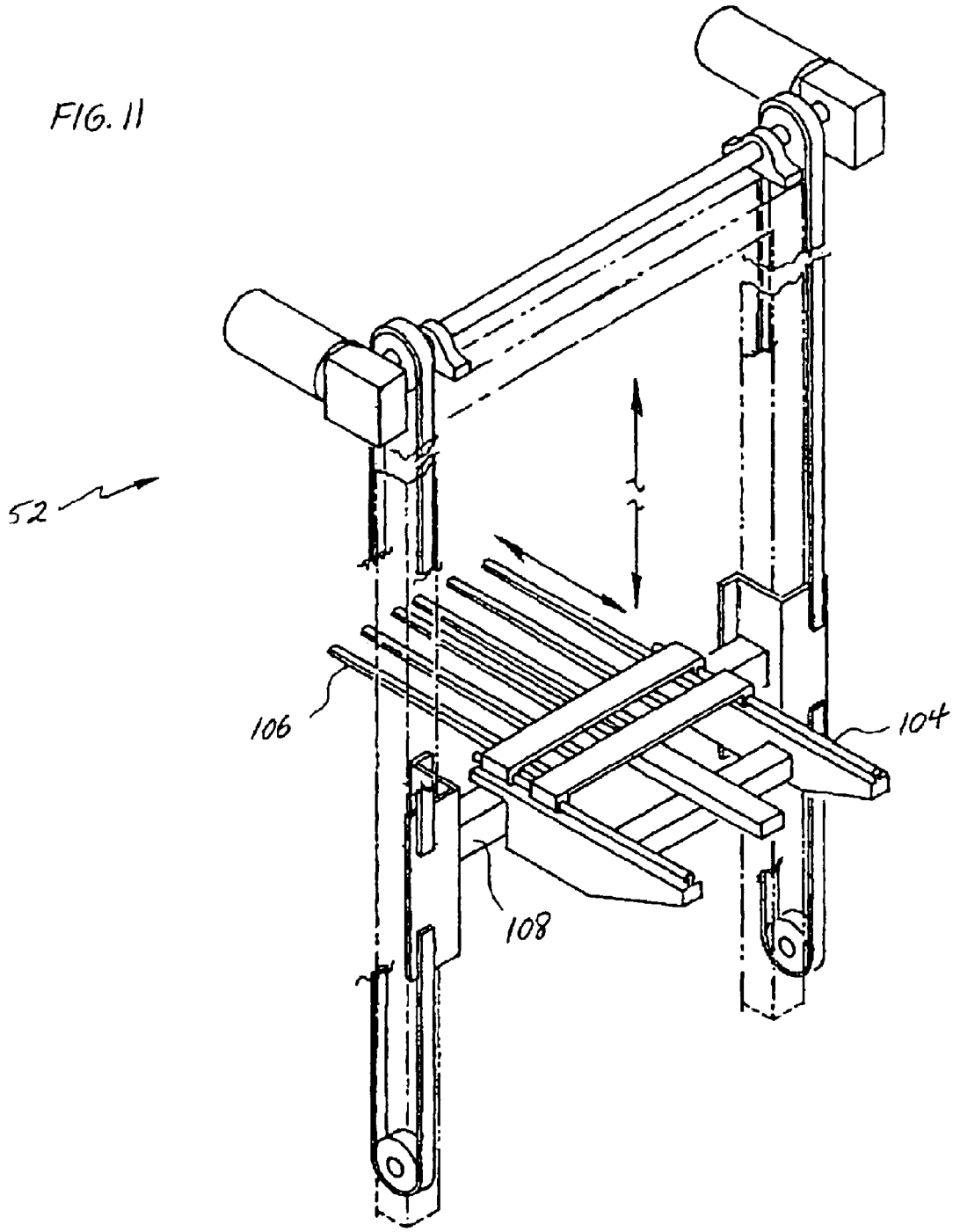
FIG. 11 is a perspective view of the staging fork assembly of the insulation blanket-packaging machine of the subject invention.

The stacks of insulation batts formed in the transfer station 26 and the groupings of one or two insulation rolls fed into the loading station 24 are moved from the transfer station and the loading station, respectively, into the compression station 28 to be compressed by the compression conveyors 94 and 96 by the staging fork assembly 52 of FIG. 11. In a preferred embodiment, the staging fork assembly 52 includes a carriage 104 with a plurality of horizontally extending, spaced-apart, parallel support prongs 106 that are affixed to a carriage 104. The carriage 104 moves the support prongs 106 between a retracted position and an extended position. In the lowermost position of the carriage 104, the upper generally horizontally extending surfaces of the support prongs 106 are immediately below the level of the upper surfaces of the conveyor belts 48 of the lower metering conveyor 40 that support the insulation batts or rolls in the loading station 24. The carriage 104 of the staging fork assembly 52 is positioned relative to the conveyor belts of 48 of the lower metering conveyor 40 so that the support prongs 106 of the staging fork assembly extend between the conveyor belts 48 when the carriage 104 has the support prongs 106 in their extended position. When the carriage 104 is retracted so that the support prongs are in their retracted position, the support prongs 106 of the staging fork assembly 52 do not extend into the loading station 24 to interfere with the operation of the launch frame assembly 50 as it moves batts from the loading station into the transfer station to form stacks of insulation batts in the transfer station. When the carriage 104 is extended to place the support prongs 106 in their extended position, the support prongs 106 extend almost to the far side of the loading station 24.

The carriage 104 carrying the support prongs 106 of the staging fork assembly 52 is in turn mounted on a second carriage 108 that moves carriage 104 of the staging fork assembly 52 vertically between its lowermost position in the loading station 24 to its uppermost position in the compression station 28. With the carriage 104 and the supporting prongs 106 of the staging fork assembly 52 in their extended and lowermost position, the carriage 104 and support prongs 106 of the staging fork assembly 52 can be raised by the carriage 108 from the loading station through the transfer station and into the compression station to move a batt from the loading station into the transfer station to complete the formation of a batt stack in the transfer station and to move the completed batt stack from the transfer station into the compression station. With the carriage 104 and the support prongs 106 of the staging fork assembly 52 in their extended and lowermost position, the carriage 104 and support prongs 102 of the staging fork assembly 52 can be raised by the carriage 108 from the loading station through the transfer station and into the compression station to move a grouping of insulation rolls from the loading station through the transfer station and into the compression station.

When the carriage 104 and support prongs 106 of the staging fork assembly 52 are in their uppermost and extended position in the compression station 92, the undersides of the support prongs 106 are located above the level of the upper surface of the lower compression conveyor 96 so that the lower compression conveyor can be extended from its retracted position to its extended position into the compression chamber. Once the lower compression conveyor 96 has been extended into the compression chamber 92, the carriage 104 with its supporting prongs 106 is retracted from the compression chamber and transfers a stack of insulation batts or a grouping of insulation rolls from the staging fork assembly 52 to the upper surface of the lower compression conveyor 96. Once the carriage 104 and support prongs 106 of the staging fork assembly 52 are fully retracted, the carriage 104 and support prongs 106 of the staging fork assembly are returned to their lowermost position in preparation for the next operating cycle. The carriage 104 on which the support prongs 106 are mounted and the carriage 108 that carries the carriage 104 are driven and controlled during their operating cycles by conventional drive trains and control systems.

As stated above, each stack of compressed insulation batts or grouping of compressed insulation rolls formed in the compression station 28 is discharged from the compression station 28 into the packaging station 30 by the upper and lower compression conveyors 94 and 96. In the packaging station 30, each compressed stack of insulation batts or groupings of compressed insulation rolls is received between upper and lower transfer conveyors 112 and 114. The upper transfer conveyor 112 is vertically adjustable relative to the lower transfer conveyor 114 so that the spacing between the transfer conveyors 112 and 114 can be maintained the same as the spacing between the upper and lower compression conveyors 94 and 96 selected for compressing each stack of insulation batts or grouping of insulation rolls being packaged. This spacing of the transfer conveyors 112 and 114 maintain each stack of compressed insulation batts or grouping of compressed insulation rolls fed into the packaging station at the selected degree of compression for packaging.

After each stack of compressed insulation batts or grouping of compressed insulation rolls passes between the transfer conveyors 112 and 114, each stack of compressed insulation batts or grouping of compressed insulation rolls is fed by the transfer conveyors 112 and 114 between upper and lower conveyors 116 and 118 of a packaging forming unit 120. Like the transfer conveyors 112 and 114, the upper conveyor 116 in the packaging unit 120 is vertically adjustable relative to the lower conveyor 118 so that the spacing between the conveyors 116 and 118 can be maintained the same as the spacing between the upper and lower compression conveyors 94 and 96 selected for compressing each stack of insulation batts or grouping of insulation rolls being packaged. This spacing of the conveyors 116 and 118 thereby maintains each stack of compressed insulation batts or grouping of compressed insulation rolls fed into the packaging unit 120 by the transfer conveyors 112 and 114 at the selected degree of compression for packaging. At the upstream end of the conveyors 116 and 118 in the packaging unit 120, continuous sheets of packaging material 122 and 124 are fed beneath the lower surface of the upper conveyor 116 and above the upper surface of the lower conveyor 118, respectively. Thus, at each stack of compressed insulation batts or grouping of compressed insulation rolls is fed from the transfer conveyors 112 and 114 between the upper and lower conveyors 116 and 118 of the packaging unit 120, each stack of insulation batts or grouping of insulation rolls is fed between the continuous upper and lower sheets of packaging material 122 and 124. The sheets 122 and 124 of packaging material are greater in width than the width of the stack of compressed insulation batts or grouping of compressed insulation rolls being packaged and have lateral edge portions that can be brought together and sealed to form the lateral package tabs 126 shown in FIGS. 3 and 4. The packaging unit 120 includes two heat sealing, ultrasonic sealing, or other conventional sealing units 128 (only one of which is shown) through which the lateral edge portions of the sheets 122 and 124 are passed to seal the lateral edge portions of the sheets together and form the lateral package tabs 126. The sealing together of the lateral edge portions of the sheets 122 and 124 forms the sheets 122 and 124 into a sleeve that envelops the stack of compressed insulation batts or grouping of compressed insulation rolls being packaged.

The packaging unit 120 also includes a transverse sealing unit 130 that is located at the downstream end of the packaging unit immediately upstream of the takeoff conveyor 32. The transverse sealing unit 130 may be a heat sealing unit, an ultrasonic sealing unit or other conventional sealing unit. The transverse sealing unit 130 is intermittently actuated to seal together transverse extending portions of the sheets 122 and 124 to form the leading transverse package tabs 132 of a package being formed in the packaging unit 120 to further enclose a stack of compressed insulation batts or grouping of compressed insulation rolls still in the packaging unit. While forming the leading package tab 132 of a package being formed within the packaging unit 120, the transverse sealing unit 130 simultaneously seals together the trailing transverse portions of the sheets 122 and 124 enclosing a stack of compressed insulation batts or grouping of compressed insulation rolls on the takeoff conveyor 32 to form a trailing package tab 134 on that package. This completes the formation of the package 200 on the takeoff conveyor and completely encloses or envelops the stack of compressed insulation batts or grouping of compressed insulation rolls within the package 200. In addition to simultaneously forming the leading and trailing package tabs 132 and 134 on the two packages, the transverse sealing unit 130 reduces the integrity or severs the sheets 122 and 124 at the juncture of the leading and trailing tabs of the packages so that the packages are or can be easily separated.

The packaging station 30 may also include a banner infeed system for inserting banners 142 intermediate the stack of compressed insulation batts or grouping of compressed insulation rolls being packaged in the packaging unit 120 and the sheet 122 of packaging material. When the banner infeed system is being utilized to insert banners 142, the sheet 122 would be sufficiently clear or translucent to enable information on the banner to be read through the sheet 122. The feed of the banners 142 would be intermittent and timed to locate each banner in a desired location on the stack of compressed insulation batts or grouping of compressed insulation rolls being packaged in the packaging unit 120. The sheets 122 and 124 are typically made of conventional packaging sheet materials, such as, but not limited to polymeric films, kraft paper, etc.

Figure 13:
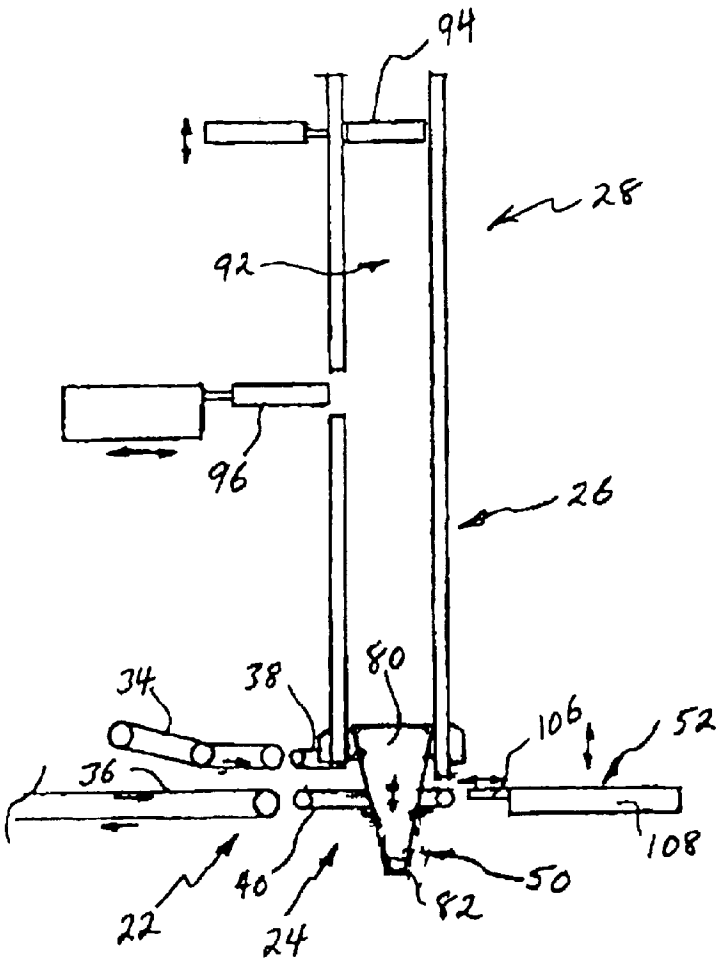
FIGS. 12 to 19 are schematic elevations of the insulation blanket-packaging machine of the subject invention showing the movement of the major components of the insulation blanket-packaging machine as the insulation blanket-packaging machine cycles through its packaging cycles.
Figure 12:
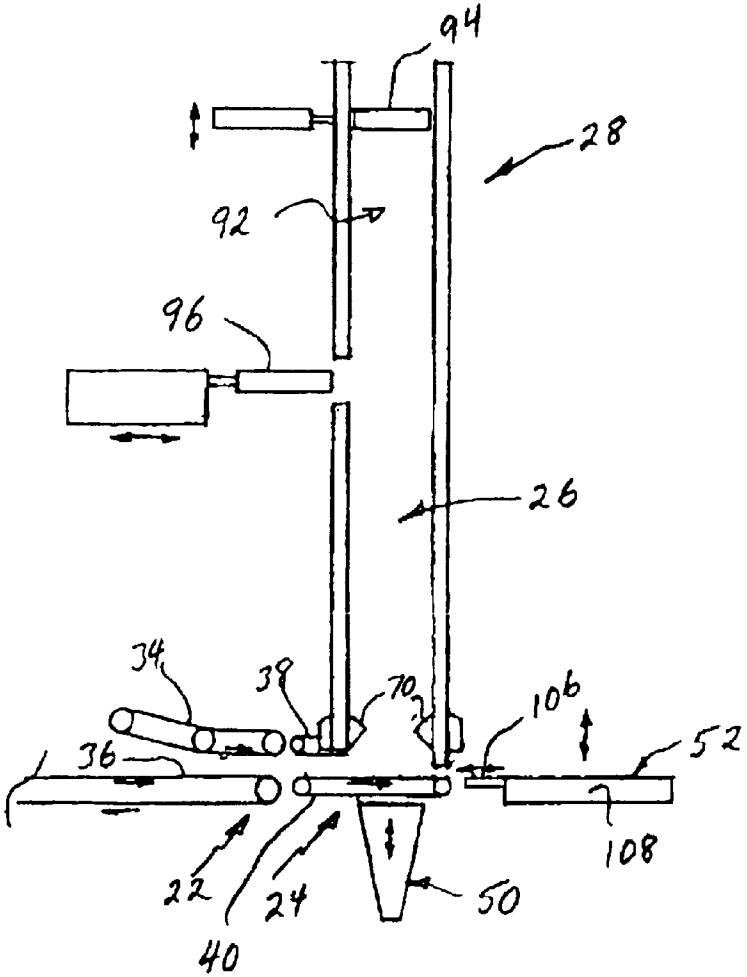

In the method of packaging unfolded and single-fold insulation batts 202 with the insulation blanket-packaging machine 20, the insulation blanket-packaging machine 20 is typically used to compress and package between 2 and 30 insulation batts 202. The operation of the insulation blanket-packaging machine 20 to package compressed insulation batts 202 will be described in connection with FIGS. 12 to 19. As shown schematically in FIG. 12, at the startup of a packaging run, the launch frame assembly 50 is in its retracted position, the staging fork assembly 52 is in its lowermost and retracted position, the lower compression conveyor 94 is in its retracted position, and the upper compression conveyor 96 is in its retracted position. While all of these machine components are in these positions, the upper and lower metering conveyor assemblies 38 and 40 are operated through a first operating cycle to feed a first insulation batt into the loading station 24. In this and each succeeding operating cycle, once a single batt has been located on the spaced apart conveyor belts 48 of the lower metering conveyor assembly 40 within the loading station 24, the stop mechanisms 42 and 44 of the upper and lower metering conveyor assemblies (not shown in FIGS. 12 to 19) are actuated to block the next succeeding insulation batt in the infeed station from passing into the loading station. Concurrent with the actuation of the stop mechanisms 42 and 44 to block the next succeeding insulation batt from being fed into the loading station 24, the launch frame assembly 50 is actuated to operate through one operating cycle where the launch frame assembly 50 reciprocates from its lowermost position shown in FIG. 12 to its uppermost position shown in FIG. 13 and back to its lowermost position shown in FIG. 12. The movement of the launch frame assembly 50 into the lower end of the transfer station 26 during its operating cycle moves the first insulation batt from the loading station 24 into the transfer station 26 where the shelf dog assemblies 70 support the first insulation batt. The metering conveyor assemblies 38 and 40 and the launch frame assembly are then alternately operated through their operating cycles to successively feed insulation batts into the loading station 24 one at a time and to then successively move each of the insulation batts from the loading station 24 into the transfer station 26. The alternate operation of the metering conveyor assemblies 38 and 40 and the launch frame assembly 50 is continued until a stack of insulation batts, one less than the desired for packaging, is formed in the transfer station 26, which also functions as a batt-stacking chamber. When a stack of insulation batts, one less than that desired for packaging, has been formed in the transfer station 26, the metering conveyor assemblies 38 and 40 continue to operate through their operating cycles to feed insulation batts into the loading station 24, but launch frame assembly 50 is deactivated for one operating cycle.

While the launch frame assembly 50 is deactivated for the one operating cycle, the staging fork assembly 52 is actuated to begin one of its operating cycles. At the beginning of its operating cycle and while the carriage 104 and support prongs 106 for the staging fork assembly are in the lowermost positions, the carriage 104 is extended to extend the support prongs 106 of the staging fork assembly horizontally into the loading station between the conveyor belts 48 of the lower metering conveyor assembly 40 as shown schematically in solid line in FIG. 14. As shown in phantom line in FIG. 14, once the support prongs 106 are fully extended, the carriage 108 is actuated to move the carriage 104 with the extended support prongs 106 up through the loading station 24, through the transfer station 26, and into the compression station 28. This movement of the carriage 104 and the extended support prongs 106 moves the insulation batt present in the loading station up into the transfer station to complete the formation of the stack of insulation batts in the transfer station and moves the completed stack of insulation batts from the transfer station into the compression station. Once the carriage 104 and support prongs 106 of the staging fork assembly 52 have cleared the loading station 24, the launch frame assembly 50 is reactivated and cooperates with the metering conveyor assemblies 38 and 40 as the assemblies operate through their operating cycles to begin the formation of the next succeeding stack of insulation batts in the transfer station 26.

Figure 15:
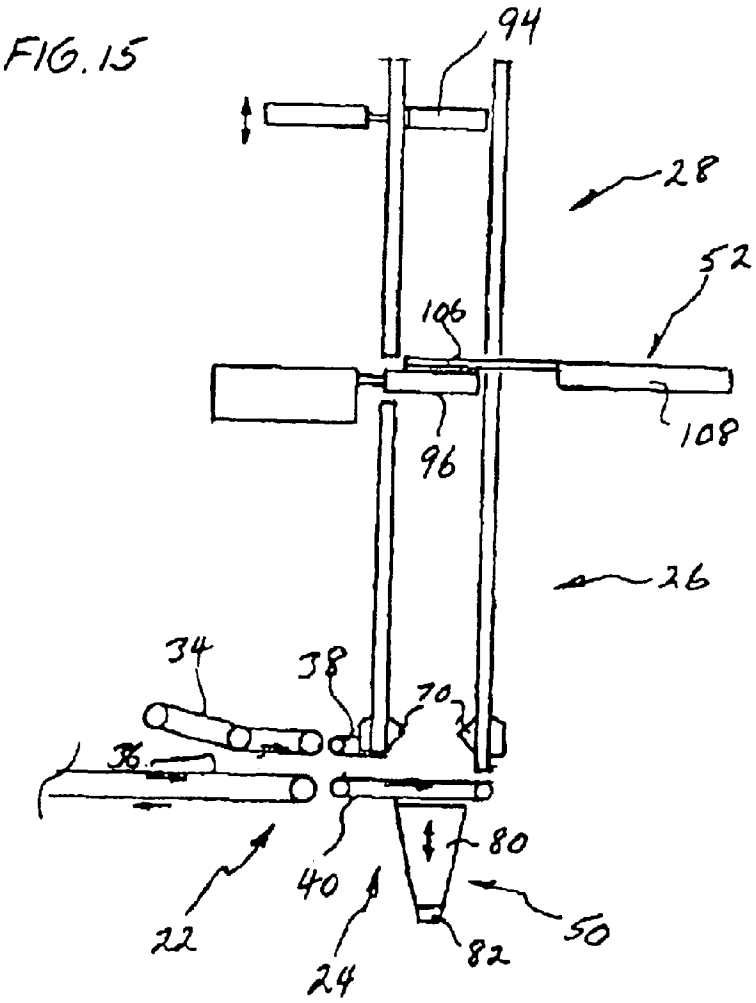
Figure 14:
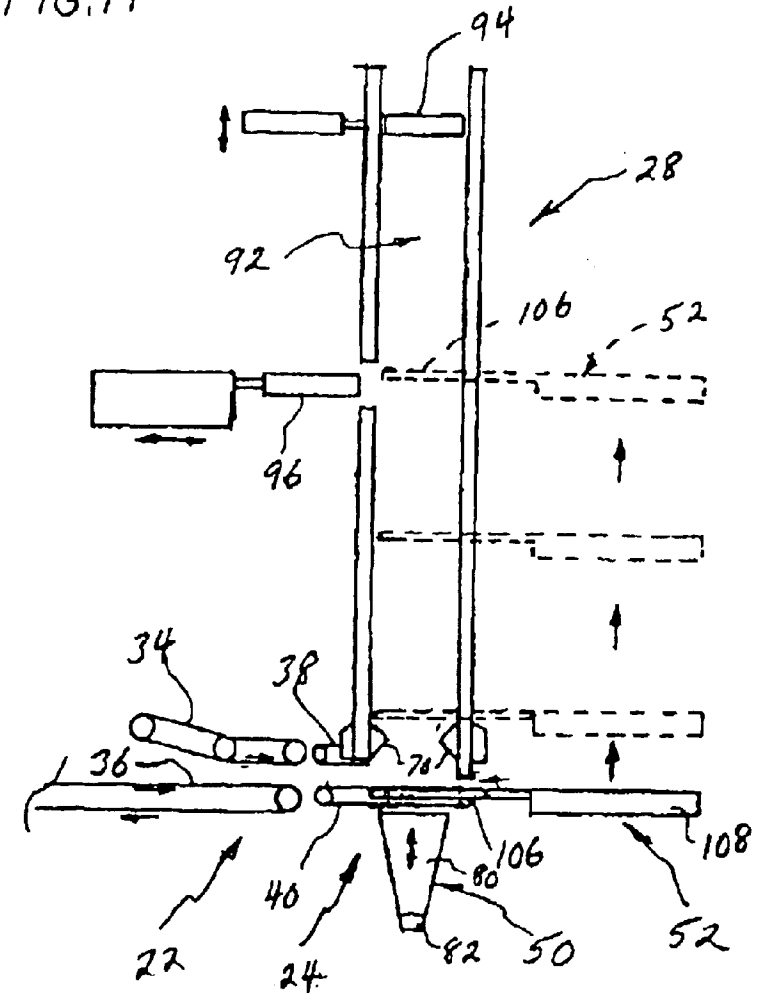

Once the carriage 104 and extended support prongs 106 are in their uppermost positions in the compression station 28, the lower compression conveyor 96 is moved horizontally from its retracted position, shown in FIG. 14, to its extended position, shown in FIG. 15. With the lower compression conveyor 96 in its extended position where the lower compression conveyor 96 forms the lower wall of the compression station's compression chamber 92, the carriage 104 and support prongs 106 of the staging fork assembly are retracted horizontally to their retracted positions as shown in phantom line in FIG. 16. This movement transfers the stack of insulation batts, moved into the compression station by the staging fork assembly, from the staging fork assembly 52 to the lower compression conveyor 96. The retracted carriage 104 and support prongs 106 of the staging fork assembly are then returned to their initial lowermost retracted position as shown in solid line in FIG. 16. While the retracted carriage 104 and support prongs 106 of the staging fork assembly are being returned to their initial lowermost retracted positions shown in FIGS 16, the metering conveyor assemblies 38 and 40 continue to cooperate with the launch frame assembly 50 to form another stack of insulation batts in the transfer station 26 and the upper compression conveyor 94 descends from its uppermost position shown in phantom line in FIG. 16 to a lowermost selected position shown in solid line in FIG. 16 to compress the stack of insulation batts in the compression station to a desired thickness for packaging.

Figure 18:
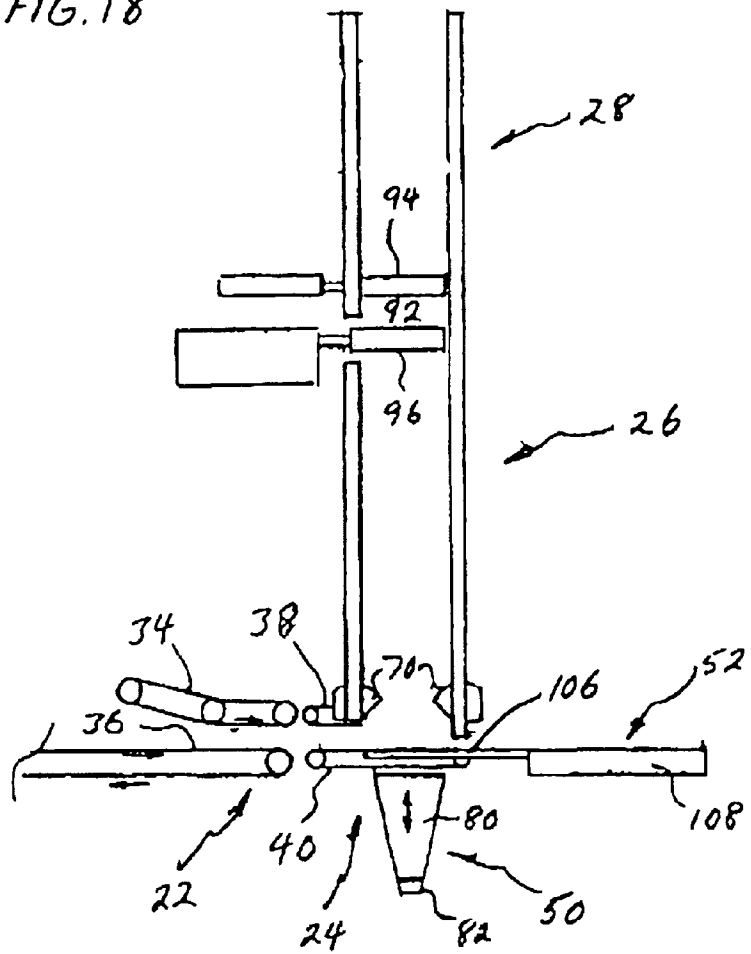
Figure 16:
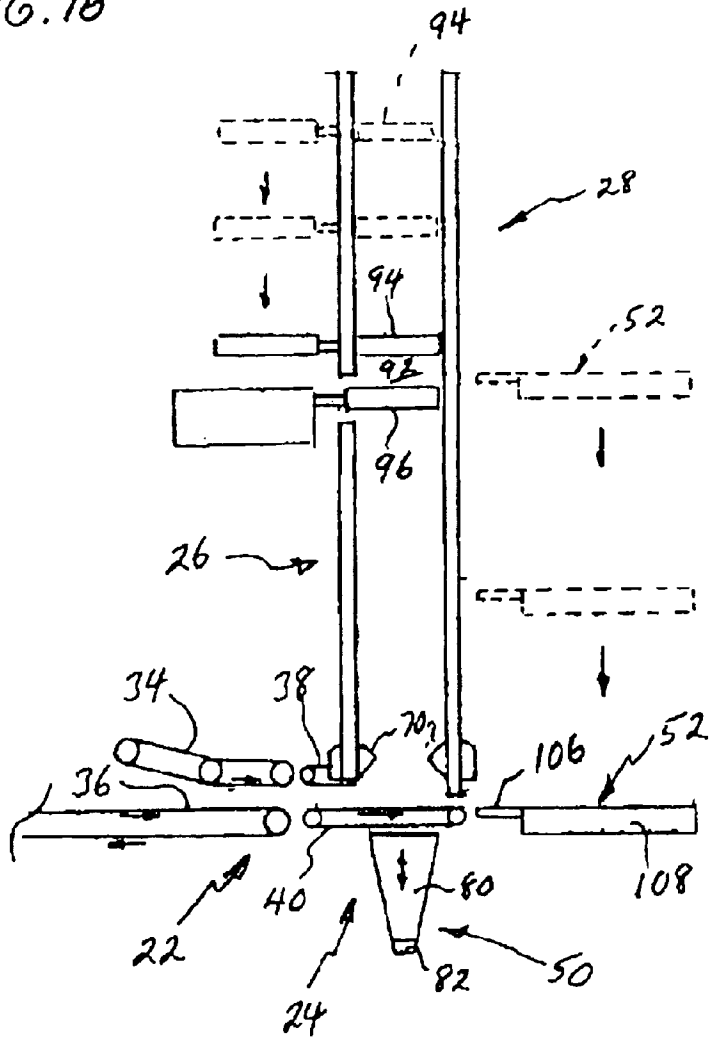
Figure 17:
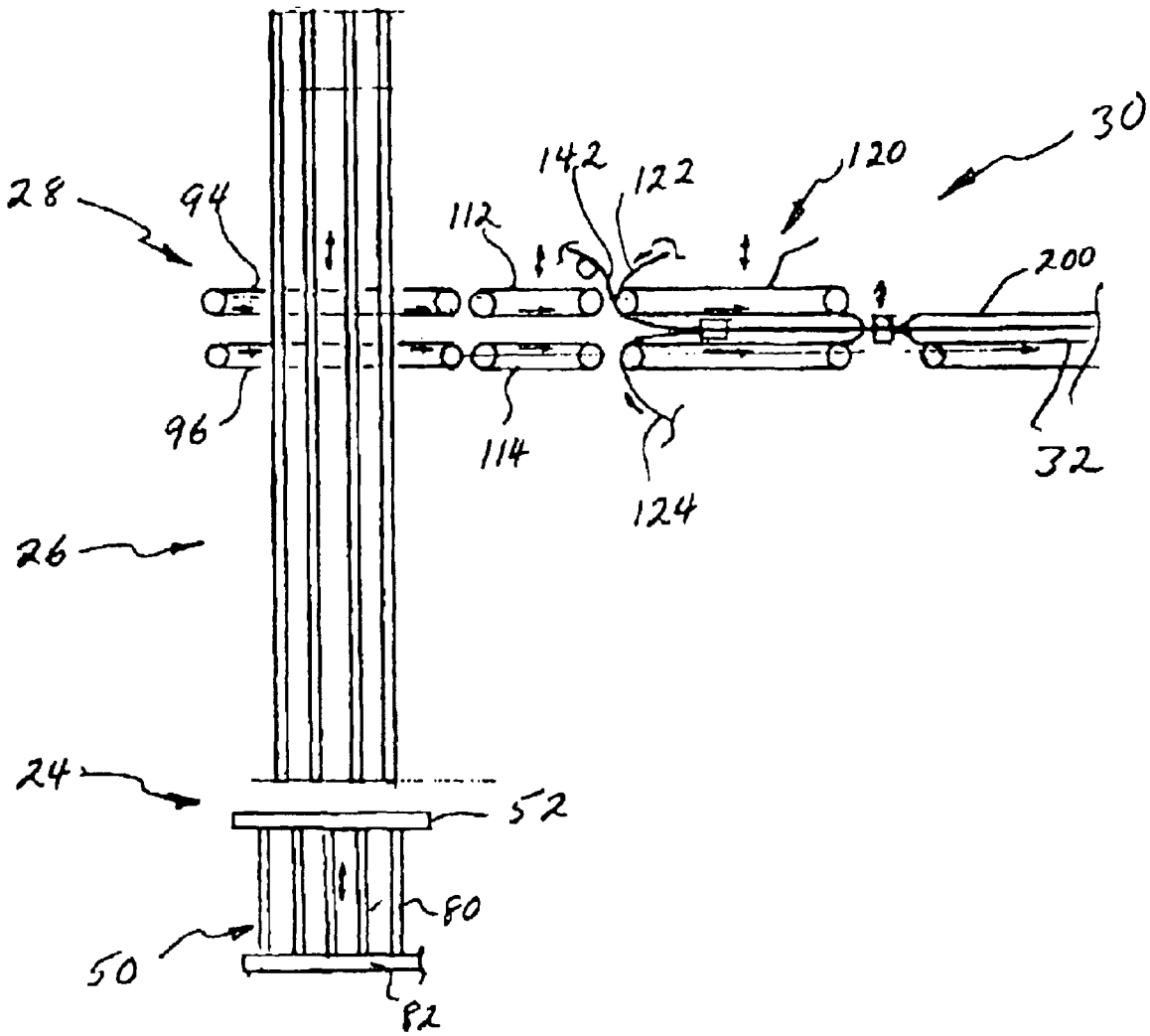

Once the upper compression conveyor 94 is in its lowermost position, the upper and lower compression conveyors 94 and 96 are actuated to move the stack of compressed insulation batts from the compression station 26 into the packaging station 28 that is shown in FIG. 17 where the stack of compressed insulation batts are received between transfer conveyors 112 and 114. As the upper and lower compression conveyors 94 and 96 are discharging the stack of compressed insulation batts into the packaging station 30 and once the selected number of insulation batts less one has again been stacked in the transfer station 26, the launch frame assembly 50 is deactivated for one of its operating cycles and another operating cycle of the staging fork assembly is initiated by extending the support prongs 106 of the staging fork assembly into the loading station 24 as shown in FIG. 18. Once the support prongs 106 of the staging fork assembly are fully exerted, the carriage 108 of the staging fork assembly 52 is actuated to move the carriage 104 with the extended support prongs 106 up through the loading station 24, through the transfer station 26, and into the compression station 28. This movement of the carriage 104 and the support prongs 106 moves the insulation batt present in the loading station up into the transfer station to complete the formation of the stack of insulation batts in the transfer station and moves the completed stack of insulation batts from the transfer station into the compression station. Once the carriage 104 and support prongs 106 of the staging fork assembly 52 have cleared the loading station 24, the launch frame assembly 50 is reactivated and cooperates with the metering conveyor assemblies 38 and 40 as the assemblies operate through their operating cycles to begin the formation of the next succeeding stack of insulation batts in the transfer station 26.

Figure 19:
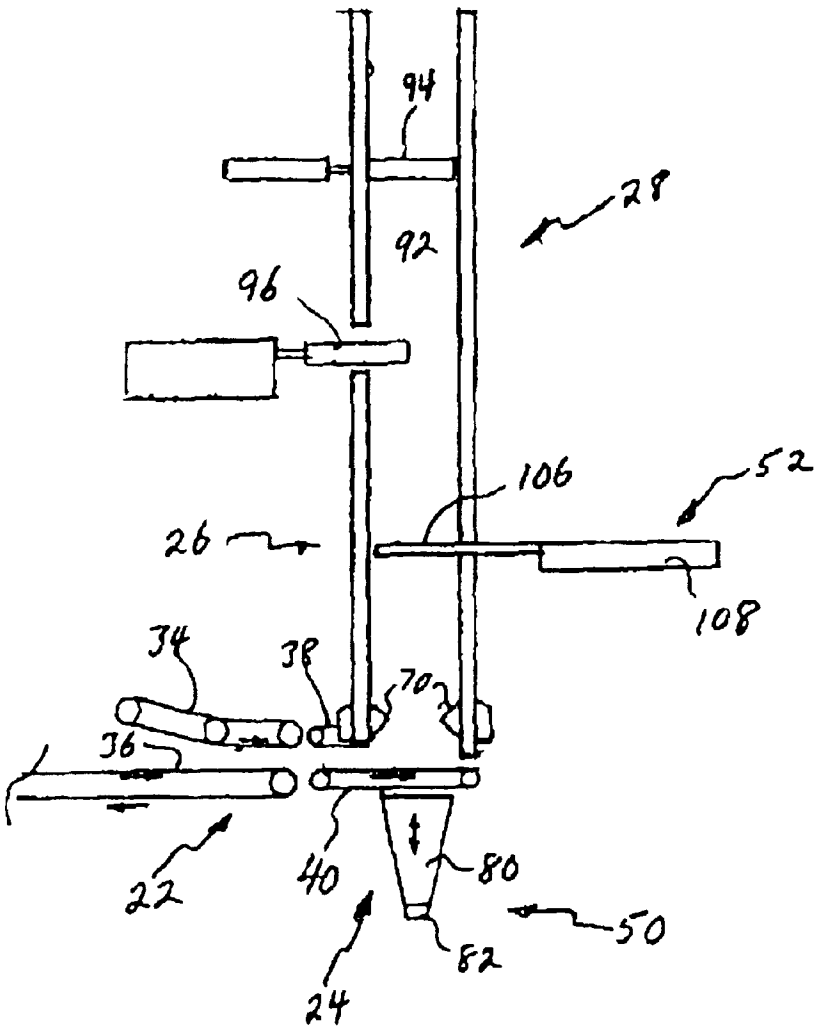

As the carriage 104 and the extended support prongs 106 of the staging fork assembly are being moved upward from the loading station 24 through the transfer station 26 as shown in FIG. 19, the upper and lower compression conveyors 94 and 96 of the compression station 28 are being retracted as shown in FIG. 19 to their retracted positions to permit the next stack of insulation batts to be moved into the compression station 28 by the staging fork assembly. At the same time that the carriage 104 and extended support prongs 106 of the staging fork assembly are moving the next stack of insulation batts into the compression station 28 and the upper and lower compression conveyors 94 and 96 are being retracted, the first compressed stack of insulation batts is being packaged in the packaging station 30 shown in FIG. 17.

Once the carriage 104 and extended support prongs 106 of the staging fork assembly are again in their uppermost positions in the compression station 28, the lower compression conveyor 96 is moved horizontally from its retracted position, shown in FIG. 14, to its extended position, shown in FIG. 15 and the packaging cycle of the insulation blanket-packaging machine 20 just described is repeated. Thus, the packaging process continues as a continuous operation with the infeed of insulation batts into the loading station, the transfer of insulation batts from the loading station into the transfer station, the formation of a stack of insulation batts in the transfer station, the compression of a previously formed batt stack in the compression station, the envelopment of a previously compressed stack of insulation batts within sheet material in the packaging station to form a package, and the removal of a package from the packaging station by the take-off conveyor.

In the method of packaging insulation rolls 206 with the insulation blanket-packaging machine 20, the insulation blanket-packaging machine 20 is typically used to compress and package 1, 2 or 3 insulation rolls. When packaging insulation rolls with the insulation blanket-packaging machine 20, the launch frame assembly 50 is deactivated. For illustrative purposes, the operation of the insulation blanket-packaging machine, when packaging a grouping of two compressed insulation rolls 206 per package 200, will be described in connection with FIGS. 12 to 19. As shown schematically in FIG. 12, at the startup of a packaging run, the launch frame assembly 50 is in its retracted position and is deactivated, the staging fork assembly 52 is in its lowermost and retracted position, the lower compression conveyor 94 is in its retracted position, and the upper compression conveyor 96 is in its retracted position. While all of these machine components are in these positions, the upper and lower metering conveyor assemblies 38 and 40 are operated through a first operating cycle to feed a first grouping of two insulation rolls into the loading station 24. In this and each succeeding operating cycle, once a grouping of insulation rolls has been located on the spaced apart conveyor belts of the lower metering conveyor assembly 40 within the loading station 24, the stop mechanisms 42 and 44 of the upper and lower metering conveyor assemblies (not shown in FIGS. 12 to 19) are actuated to block the next succeeding grouping of insulation rolls in the infeed station from passing into the loading station. Concurrent with the actuation of the stop mechanism 42 and 44 to block the next succeeding grouping of insulation rolls from being fed into the loading station 24, the staging fork assembly 52 is actuated to being one of its operating cycles. At the beginning of its operating cycle and while the carriage 104 and support prongs 106 of the staging fork assembly are in their lowermost positions, the carriage 104 is extended to extend the support prongs 102 of the staging fork assembly horizontally into the loading station between the conveyor belts 48 of the lower metering conveyor assembly 40 as shown schematically in solid line in FIG. 14. As shown in phantom line in FIG. 14, once the support prongs 102 of the staging fork assembly are fully extended, the carriage 108 of the staging fork assembly is actuated to move the carriage 104 with the extended support prongs 106 up through the loading station 24, through the transfer station 26, and into the compression station 28. This movement of the carriage 104 and extended support prongs 106 of the staging fork assembly moves the grouping of insulation rolls present in the loading station up through the transfer station into the compression station. Once the carriage 104 and extended support prongs 106 of the staging fork assembly 52 have cleared the loading station 24, the metering conveyor assemblies 38 and 40 are again operated through an operating cycle to feed the next grouping of insulation rolls into the loading station.

Once the carriage 104 and extended support prongs 106 of the staging fork assembly are in their uppermost positions in the compressions station 28, the lower compression conveyor 96 is moved horizontally from its retracted position, shown in FIG. 14, to its extended position, shown in FIG. 15. With the lower compression conveyor 96 in its extended position, the lower compression conveyor 96 forms the lower wall of the compression station's compression chamber 92. With the lower compression conveyor 96 extended, the carriage 104 and support prongs 106 of the staging fork assembly are retracted horizontally from the compression station 28 into their retracted positions, as shown in phantom line in FIG. 16, to transfer the grouping of insulation rolls from the staging fork assembly 52 to the lower compression conveyor 96. The retracted carriage 104 and support prongs 106 of the staging fork assembly are then returned to their initial lowermost retracted positions as shown in solid line in FIG. 16. While the retracted carriage 104 and support prongs 102 of the staging fork assembly are being returned to their initial lowermost retracted positions, the upper compression conveyor 94 descends from its uppermost position shown in phantom line in FIG. 16 to a lowermost selected position shown in solid line in FIG. 16 to compress the grouping of insulation rolls in the compression station to a desired thickness for packaging.

Once the upper compression conveyor 94 is in its lowermost position, the upper and lower compression conveyors 94 and 96 are actuated to move the grouping of compressed insulation rolls from the compression station 26 into the packaging station 30, shown in FIG. 17, where the grouping of compressed insulation rolls are received between transfer conveyors 112 and 114. As the upper and lower compression conveyors 94 and 96 are discharging the grouping of compressed insulation rolls into the packaging station, the carriage 104 and support prongs 106 of the staging fork assembly 52 are again extended into the loading station 24 as shown in FIG. 18 as another operating cycle for the staging fork assembly 52 is initiated. Once the support prongs 106 of the staging fork assembly are fully extended, the carriage 108 of the staging fork assembly 52 is actuated to move the carriage 104 with the extended support prongs 106 up through the loading station 24, through the transfer station 26, and into the compression station 28. This movement of the carriage 104 and support prongs 106 moves the grouping of insulation rolls present in the loading station up into the compression station. Once the carriage 104 and extended prongs 106 of the staging fork assembly 52 have cleared the loading station 24, the metering conveyor assemblies 38 and 40 feed the next succeeding grouping of insulation rolls in the loading station 24.

As the carriage 104 and the extended support prongs 106 of the staging fork assembly are being moved upward through the transfer station as shown in FIG. 19, the upper and lower compression conveyors 94 and 96 are being retracted as shown in FIG. 19 to their retracted positions to permit the next grouping of insulation rolls to be moved into the compression station 28 by the carriage and extended support prongs 106 of the staging fork assembly. At the same time as the carriage 104 and extended support prongs 106 of the staging fork assembly are moving the next grouping of insulation rolls into the compression station 28 and the upper and lower compression conveyors are being retracted, the first compressed grouping of insulation rolls is being packaged in the packaging station 30.

Once the carriage 104 and extended support prongs 102 are again in their uppermost positions in the compression station 28, the lower compression conveyor 96 is moved horizontally from its retracted position, shown in FIG. 14, to its extended position, shown in FIG. 15 and the packaging cycle of the insulation blanket-packaging machine 20 just described is repeated. Thus, the packaging process continues as a continuous operation with the infeed of a grouping of insulation rolls into the loading station, the transfer of a grouping of insulation rolls from the loading station into the compression station, the compression of a grouping of insulation rolls in the compression station, the envelopment of a previously compressed grouping of insulation rolls within sheet material in the packaging station to form a package, and the removal of a package from the packaging station by the takeoff conveyor 32.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. An insulation blanket-packaging machine, comprising:

an insulation blanket loading station for successively receiving insulation blankets; the insulation blankets each having a length and a width that define major surfaces of the insulation blanket and a thickness; the insulation blankets each being compressible;

an insulation blanket transfer station for successively receiving insulation blankets from the insulation blanket loading station and vertically transferring the insulation blankets from the insulation blanket loading station to an insulation blanket compression station;

vertical insulation blanket moving means for successively elevating groupings of one or more insulation blankets at a time in a generally vertical direction from the insulation blanket loading station up through the insulation blanket transfer station into the insulation blanket compression station while simultaneously permitting insulation blankets to be fed into the loading station;

the insulation blanket compression station comprising upper and lower compression conveyors for successively receiving there between the groupings of one or more insulation blankets moved from the insulation blanket loading station through the insulation blanket transfer station into the insulation blanket compression station by the vertical insulation blanket moving means; the upper and lower compression conveyors being movable relative to each other for successively compressing each grouping of one or more insulation blankets located intermediate the upper and lower compression conveyors to successively form groupings of one or more compressed insulation blankets; the upper and lower compression conveyors being operable to successively move each grouping of one or more compressed insulation blankets from the insulation blanket compression station into an insulation blanket packaging station; and the insulation blanket packaging station comprising means for successively enveloping each grouping of one or more compressed insulation blankets fed from the insulation blanket compression station into the insulation blanket packaging station within sheet material to successively form packages of each grouping of one or more compressed insulation blankets fed from the insulation blanket compression station into the insulation blanket packaging station.

2. The insulation blanket-packaging machine according to claim 1, wherein:

the insulation blanket loading station is for receiving insulation blankets in the form of unfolded or single-fold insulation batts;

the insulation blanket transfer station and the vertical insulation blanket moving means are for moving each grouping of one or more unfolded or single-fold insulation batts from the insulation blanket loading station into the insulation blanket compression station with the major surfaces of the one or more unfolded or single-fold batts in each grouping oriented to lie in planes parallel to planes of compressing surfaces of the compression conveyors of the compression station;

the compressing conveyors are for compressing the one or more unfolded or single-fold batts in each grouping in a direction perpendicular to the thicknesses of the one or more unfolded or single-fold batts in each grouping to form each grouping of one or more unfolded or single-fold insulation batts into a grouping of one or more compressed unfolded or single-fold insulation batts; and the vertical insulation blanket moving means comprising reciprocating insulation blanket supporting and elevating means that reciprocates from a retracted position to an extended position in the insulation blanket loading station for successively engaging and elevating groupings of one or more insulation blankets from the insulation blanket loading station through the insulation blanket transfer station into the insulation blanket compression station and back to the retracted position while in the insulation blanket compression station with the reciprocating insulation blanket supporting and elevating means being retracted as the lower compression conveyor of the insulation blanket compression station advances to successively transfer the groupings of one or more insulation blankets from the reciprocating insulation blanket support and elevating means to the lower compression conveyor of the insulation blanket compression station for the successive compression of the groupings of one or more insulation blankets in the compression station.

3. The insulation blanket-packaging machine according to claim 1, wherein:

the insulation blanket loading station is for receiving insulation blankets in groupings of one or more spiral wound rolls of insulation blanket having a generally round shape;

the insulation blanket transfer station and the vertical insulation blanket moving means are for moving each grouping of one or more spiral wound rolls of insulation blanket from the insulation blanket loading station into the insulation blanket compression station with central axes of the one or more spiral wound rolls of insulation blanket in each grouping being oriented to lie in planes parallel to planes of compressing surfaces of the compression conveyors of the compression station;

the compressing conveyors are for compressing the one or more spiral wound rolls of insulation blanket in each grouping in a direction perpendicular to the central axes of the one or more spiral wound rolls of insulation blanket in each grouping to form each grouping of one or more spiral wound rolls of insulation blanket into a grouping of one or more compressed spiral wound rolls of insulation blanket having a generally flat oval shape; and the vertical insulation blanket moving means comprising reciprocating insulation blanket supporting and elevating means that reciprocates from a retracted position to an extended position in the insulation blanket loading station for successively engaging and elevating groupings of one or more insulation blankets from the insulation blanket loading station through the insulation blanket transfer station into the insulation blanket compression station and back to the retracted position while in the insulation blanket compression station with the reciprocating insulation blanket supporting and elevating means being retracted as the lower compression conveyor of the insulation blanket compression station advances to successively transfer the groupings of one or more insulation blankets from the reciprocating insulation blanket support and elevating means to the lower compression conveyor of the insulation blanket compression station for the successive compression of the groupings of one or more insulation blankets in the compression station.

4. An insulation blanket-packaging machine, comprising:

a batt loading station for receiving batts; the batts each having a length and a width that define major surfaces of the batt and a thickness; the batts each being compressible in a direction generally perpendicular to the thickness of the batt;

a transfer and batt-stacking station for receiving batts from the batt loading station;

vertical batt moving means for successively moving batts in a generally vertical direction from the batt loading station into the transfer and batt-stacking station;

means in the transfer and batt-stacking station for successively forming batt stacks of vertically stacked batts from batts successively moved into the transfer and batt-stacking station from the batt loading station;

a batt stack compression station for successively receiving batt stacks from the transfer and batt-stacking station; and vertical batt stack moving means for successively moving batt stacks in a generally vertical direction from the transfer and batt-stacking station into the batt compression station;

the vertical batt moving means successively moving batts from the batt loading station into the transfer and batt-stacking station until a first selected number of batts, that is one less than a second selected number of batts to be formed into the batt stack in the transfer and batt-stacking station, has been moved into the transfer and batt-stacking station; the vertical batt moving means being deactivated once the first selected number of batts has been moved into the transfer and batt-stacking station; the vertical batt stacking moving means being activated to move a single batt from the batt loading station into the transfer and batt-stacking station to complete the formation of the batt stack in the transfer and batt-stacking and move the batt stack thus formed from the transfer and batt-stacking station into the batt compression station when the vertical batt moving means is deactivated; and the vertical batt moving means being reactivated to again successively move batts from the batt loading station into the transfer and batt-stacking station once the vertical batt moving means has moved the single batt into the transfer and batt-stacking station from the batt loading station to complete the formation of the batt stack in the transfer and batt-stacking station;

the batt compression station comprising upper and lower compression conveyors for successively receiving there between batt stacks fed from the transfer and batt-stacking station into the batt compression station; the upper and lower compression conveyors being movable relative to each other for successively compressing batt stacks located intermediate the upper and lower compression conveyors in a direction perpendicular to the thicknesses of the batts in the batt stacks to successively form compressed batt stacks; the upper and lower compression conveyors being operable to successively move the compressed batt stack from the batt compression station into a batt packaging station; and the batt packaging station comprising means for successively enveloping compressed batt stacks successively fed from the batt compression station into the batt packaging station within sheet material to successively form packages of the compressed batt stacks fed from the batt compression station into the batt packaging station.

5. The insulation blanket-packaging machine according to claim 4, including:

means for successively feeding batts into the batt loading station; and means for successively removing packages from the batt packaging station.

6. The insulation blanket-packaging machine according to claim 4, wherein:

the vertical batt moving means for successively moving batts in a generally vertical direction from the batt loading station into the transfer and batt-stacking station elevates the batts;

the vertical batt stack moving means for moving the successively formed batt stacks from the transfer and batt-stacking station into the batt compression station elevates the batt stacks; and the compression conveyors are operative to move the compressed batt stacks in a generally horizontal direction into the batt packaging station.

7. The insulation blanket-packaging machine according to claim 4, wherein:

the vertical batt moving means for successively moving batts in a generally vertical direction from the batt loading station into the transfer and batt-stacking station is a reciprocating launch frame that reciprocates between a retracted position for permitting batts to be successively fed into the batt loading station and an extended position for successively feeding the batts from the batt loading station into a batt-stacking chamber of the transfer and batt-stacking station.

8. The insulation blanket-packaging machine according to claim 4, wherein:

the vertical batt moving means for successively moving batts in a generally vertical direction from the batt loading station into the transfer and batt-stacking station is a reciprocating launch frame that reciprocates between a retracted position for permitting batts to be successively fed into the batt loading station and an extended position for successively elevating and feeding the batts from the batt loading station into a batt-stacking chamber of the transfer and batt-stacking station; and the batt-stacking chamber of the transfer and batt-stacking station includes means for retaining the batts successively fed into the batt-stacking chamber of the transfer batt-stacking station stacked and elevated above the batt loading station until the vertical batt stack moving means for vertically moving the successively formed batt stacks from the transfer and batt-stacking station into the batt compression station moves the successively formed batt stacks into the batt compression station.

9. The insulation blanket-packaging machine according to claim 4, wherein:

the vertical batt moving means for successively moving batts in a generally vertical direction from the batt loading station into the transfer and batt-stacking station is a reciprocating launch frame that reciprocates between a retracted position for permitting batts to be successively fed into the batt loading station and an extended position for successively elevating and feeding the batts from the batt loading station into a batt-stacking chamber of the transfer and batt-stacking station; and the batt-stacking chamber of the transfer and batt-stacking station includes means for retaining the batts successively fed into the batt-stacking chamber of the transfer and batt-stacking station stacked and elevated above the batt loading station until the vertical batt stack moving means for vertically moving the successively formed batt stacks from the transfer and batt-stacking station into the batt compression station moves the successively formed batt stacks into the batt compression station; and the vertical batt stack moving means for vertically moving the successively formed batt stacks from the transfer and batt-stacking station into the batt compression station comprises reciprocating batt stack supporting and elevating means that reciprocates from a retracted position for permitting the batts to be successively fed from the batt loading station into the batt-stacking chamber of the transfer and batt-stacking station by the vertical batt moving means during the formation of each batt stack in the transfer and batt-stacking station to an extended position for moving the single batt from the batt loading station into the transfer and batt-stacking station to complete the formation of each batt stack in the transfer and batt-stacking station and for supporting the batt stack thus formed while the batt stack is elevated within the batt-stacking chamber from the transfer and batt-stacking station into the batt compression station and back to the retracted position while in the batt compression station with the reciprocating batt stack supporting and elevating means being retracted as the lower compression conveyor of the batt compression station advances to transfer the batt stack from the reciprocating batt stack support and elevating means to the lower compression conveyor for compression in a compression chamber of the batt compression station.

10. An insulation blanket-packaging machine, comprising:

a batt loading station for receiving batts; the batts each having a length and a width that define major surfaces of the batt and a thickness; the batts each being compressible in a direction generally perpendicular to the thickness of the batt;

a transfer and batt-stacking station for receiving batts from the batt loading station;

vertical batt moving means for successively moving batts in a generally vertical direction from the batt loading station into the transfer and batt-stacking station; the vertical batt moving means for successively moving batts in a generally vertical direction from the batt loading station into the transfer and batt-stacking station being a reciprocating launch frame that reciprocates between a retracted position for permitting the batts to be successively fed into the batt loading station and an extended position for successively elevating and feeding the batts from the batt loading station into a batt-stacking chamber of the transfer and batt-stacking station;

a batt stack compression station for successively receiving batt stacks from the transfer and batt-stacking station;

vertical batt stack moving means for successively moving batt stacks in a generally vertical direction from the transfer and batt-stacking station into the batt compression station;

the batt-stacking chamber of the transfer and batt-stacking station comprising means for successively forming batt stacks of vertically stacked batts from batts successively moved into the transfer and batt-stacking station from the batt loading station that includes means for retaining the batts successively fed into the batt-stacking chamber of the transfer and batt-stacking station stacked and elevated above the batt loading station until the vertical batt stack moving means for vertically moving the successively formed batt stacks from the transfer and batt-stacking station into the batt compression station moves the successively formed batt stacks into the batt compression station;

the batt compression station comprising upper and lower compression conveyors for successively receiving there between batt stacks fed from the transfer and batt-stacking station into the batt compression station; the upper and lower compression conveyors being movable relative to each other for successively compressing batt stacks located intermediate the upper and lower compression conveyors in a direction perpendicular to the thicknesses of the batts in the batt stacks to successively form compressed batt stacks; the upper and lower compression conveyors being operable to successively move the compressed batt stacks from the batt compression station into a batt packaging station;

the vertical batt stack moving means for vertically moving the successively formed batt stacks from the transfer and batt-stacking station into the batt compression station comprises reciprocating batt stack supporting and elevated means that reciprocates from a retracted position for permitting the batts to be successively fed from the batt loading station into the batt-stacking chamber of the transfer and batt-stacking station by the vertical batt moving means during the formation of each batt stack in the transfer and batt-stacking station to an extended position for moving the single batt from the batt loading station into the transfer and batt-stacking station to complete the formation of each batt stack in the transfer and batt-stacking station and for supporting the batt stack thus formed while the batt stack is elevated within the batt-stacking chamber from the transfer and batt-stacking station into the batt compression station and back to the retracted position while in the batt compression station with the reciprocating batt stack supporting and elevating means being retracted as the lower compression conveyor of the batt compression station advances to transfer the batt stack from the reciprocating batt stack support and elevating means to the lower compression conveyor for compression in a compression chamber of the batt compression station; and the batt packaging station comprising means for successively enveloping compressed batt stacks successively fed from the batt compression station into the batt packaging station within sheet material to successively form packages of the compressed batt stacks fed from the batt compression station into the batt packaging station; the means for successively enveloping compressed batt stacks comprising a means for feeding a first sheet of packaging material over the compressed batt stacks successively fed from the batt compression station into the batt packaging station; a means for feeding a second sheet of packaging material beneath the compressed batt stacks successively fed from the batt compression station into the batt packaging station; and means for sealing lateral edges of the sheets of packaging material together, for transversely sealing portions of the sheets of packaging material together intermediate the successive compressed batt stacks fed from the batt compression station, and for transversely serving the sheets of packaging material intermediate the successive compressed batt stacks fed from the batt compression station to successively encapsulate the compressed batt stacks to form the packages.

11. The insulation blanket-packaging machine according to claim 10, wherein:

the batt packaging station includes means for successively depositing banners intermediate one the sheets of packaging material and the compressed batt stacks successively fed from the batt compression station; and the packaging material is sufficiently clear to view the banner through the packaging material.

12. The insulation blanket-packaging machine according to claim 10, wherein:

the means for retaining the batts successively fed into the batt-stacking chamber of the transfer and batt-stacking station stacked and elevated above the loading station until the means for vertically moving the successively formed batt stacks from the transfer and batt-stacking station into the batt compression station, moves the successively formed batt stacks into the batt compression station, comprises a series of opposed retaining mechanisms adjacent a bottom end of the batt-stacking chamber that each include a pivotally mounted support element that pivots between an extended position where an upper surface of the support element projects out into the batt-stacking chamber to engage an underside of and support a batt within the batt-stacking chamber and a retracted position where a batt can be fed into the batt-stacking chamber by the launch frame of the batt loading station; the support element being moved to the retracted position by a batt being fed into the batt-stacking chamber from the batt loading station by the launch frame of the batt loading station; and the retaining mechanism including means for urging the support element into the extended position after a batt is moved past the upper surface of the support element to place the support element in the extended batt supporting position.

13. An insulation blanket-packaging machine, comprising:

a batt loading station for receiving batts: the batts each having a length and a width that define major surfaces of the batt and a thickness; the batts each being compressible in a direction generally perpendicular to the thickness of the batt;

a transfer and batt-stacking station for receiving batts from the batt loading station;

vertical batt moving means for successively moving batts in a generally vertical direction from the batt loading station into the transfer and batt-stacking station;

means in the transfer and batt-stacking station for successively forming batt stacks of vertically stacked batts from batts successively moved into the transfer and batt-stacking station from the batt loading station;

a batt stack compression station for successively receiving batt stacks from the transfer and batt-stacking station;

vertical batt stack moving means for successively moving batt stacks in a generally vertical direction from the transfer and batt-stacking station into the batt compression station;

the batt compression station comprising upper and lower compression conveyors for successively receiving there between batt stacks fed from the transfer and batt-stacking station into the batt compression station; the upper and lower compression conveyors being movable relative to each other for successively compressing batt stacks located intermediate the upper and lower compression conveyors in a direction perpendicular to the thicknesses of the batts in the batt stacks to successively form compressed batt stacks; the upper and lower compression conveyors being operable to successively move the compressed batt stacks from the batt compression station into a batt packaging station; and the batt packaging station comprising means for successively enveloping compressed batt stacks successively fed from the batt compression station into the batt packaging station within sheet material to successively form packages of the compressed batt stacks fed from the batt compression station into the batt packaging station; the means for successively enveloping compressed batt stacks comprising a means for feeding a first sheet of packaging material over the compressed batt stacks successively fed from the batt compression station into the batt packaging station; a means for feeding a second sheet of packaging material beneath the compressed batt stacks successively fed from the batt compression station into the batt packaging station; and means for sealing lateral edges of the sheets of packaging material together, for transversely sealing portions of the sheets of packaging material together intermediate the successive compressed batt stacks fed from the batt compression station, and for transversely severing the sheets of packaging material intermediate the successive compressed batt stacks fed from the batt compression station to successively encapsulate the compressed batt stacks to form the packages.

14. The insulation blanket-packaging machine according to claim 13, wherein:

the packaging station includes means for successively depositing banners intermediate one the sheets of packaging material and the compressed batt stacks successively fed from the batt compression station; and the packaging material is sufficiently clear to view the banner through the packaging material.

*15. An insulation blanket-packaging machine, comprising:*

*an insulation blanket loading station for receiving compressible insulation blankets;*

*an insulation blanket elevator for successively elevating groupings of one or more insulation blankets at a time in a generally vertical direction from the insulation blanket loading station into an insulation blanket compression station while simultaneously permitting insulation blankets to be fed into the loading station;*

*the insulation blanket compression station comprising upper and lower compression devices for successively*

*receiving there between the groupings of one or more insulation blankets moved from the insulation blanket loading station into the insulation blanket compression station by the insulation blanket elevator; the upper and lower compression being movable relative to each other for compressing each grouping of one or more insulation blankets located intermediate the upper and lower compression devices to form groupings of one or more compressed insulation blankets;*

*a transport mechanism operable to move each grouping of one or more compressed insulation blankets from the insulation blanket compression station into an insulation blanket packaging station; and*

*the insulation blanket packaging station comprising a package forming unit that encloses each grouping of one or more compressed insulation blankets fed from the insulation blanket compression station into the insulation blanket packaging station within sheet material to successively form packages of each grouping of one or more compressed insulation blankets.*

*16. The insulation blanket-packaging machine of claim 15, wherein said compression devices comprise upper and lower conveyors that are movable relative to one another, and which also form said transport mechanism.*

*17. The insulation blanket-packaging machine of claim 15, wherein said upper and lower conveyors form said transport mechanism.*

*18. The insulation blanket-packaging machine of claim 15, wherein said elevator is located within a transfer station in which a predetermined number of said insulation blankets are successively stacked upon one another to form one of said groupings, prior to being elevated to said compression station.*

*19. An insulation blanket-packaging machine, comprising:*

*a batt loading station for receiving batts;*

*a transfer and batt-stacking station for receiving batts from the batt loading station;*

*a batt stack compression station for successively receiving batt stacks from the transfer and batt-stacking station;*

*a batt stacker and elevator for successively forming stacks of vertically stacked batts by successively moving batts from the batt loading station into the transfer and batt-stacking station until a first selected number of batts, that is one less than a second selected number of batts to be formed into the batt stack in the transfer and batt-stacking station, has been moved into the transfer and batt-stacking station from the batt loading station, said batt stacker being deactivated once the first selected number of batts has been moved into the transfer and batt-stacking station, and said elevator being activated to move a single batt from the batt loading station into the transfer and batt-stacking station to complete the formation of the batt stack in the transfer and batt-stacking station and elevate the batt stack thus formed from the transfer and batt-stacking station into the batt compression station; and the batt stacker being reactivated to again successively move batts from the batt loading station into the transfer and batt-stacking station once the elevator has moved the single batt into the transfer and batt-stacking station from the batt loading station to complete the formation of the batt stack in the transfer and batt-stacking station;*

*said batt compression station comprising upper and lower compression devices for successively receiving therebetween batt stacks fed from the transfer and batt-stacking station into the batt compression station; said upper and lower compression devices being movable relative to each other for successively compressing batt stacks located intermediate the upper and lower compression devices in a direction perpendicular to the thicknesses of the batts in the batt stacks to successively form compressed batt stacks; and*

*a batt packaging station that packages compressed batt stacks successively fed from the batt compression station to form packages of the compressed batt stacks fed from the batt compression station into the batt packaging station.*

*20. The insulation blanket-packaging machine of claim 19, wherein said compression devices comprise upper and lower conveyors that are movable relative to one another.*

*21. The insulation blanket-packaging machine of claim 19, wherein said batt stacker comprises a reciprocating launch frame that reciprocates between a retracted position for permitting the batts to be successively fed into the batt loading station and an extended position for successively elevating and feeding the batts from the batt loading station into a batt-stacking chamber of the transfer and batt-stacking station.*

* * * * *